US007729558B2

United States Patent
Kondo et al.

(10) Patent No.: US 7,729,558 B2
(45) Date of Patent: Jun. 1, 2010

(54) IMAGE SIGNAL, PROCESSING DEVICE AND PROCESSING METHOD, COEFFICIENT DATA GENERATION DEVICE AND GENERATION METHOD USED FOR THE SAME, PROGRAM FOR EXECUTING THE METHODS AND COMPUTER READABLE MEDIUM CONTAINING THE PROGRAM

(75) Inventors: Tetsujiro Kondo, Tokyo (JP); Tsutomu Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1295 days.

(21) Appl. No.: 10/535,573

(22) PCT Filed: Nov. 11, 2003

(86) PCT No.: PCT/JP03/14321

§ 371 (c)(1),
(2), (4) Date: May 19, 2005

(87) PCT Pub. No.: WO2004/047454

PCT Pub. Date: Jun. 3, 2004

(65) Prior Publication Data

US 2006/0110051 A1    May 25, 2006

(30) Foreign Application Priority Data

Nov. 20, 2002    (JP) .............................. 2002-337196

(51) Int. Cl.
*G06K 9/40* (2006.01)
(52) U.S. Cl. ...................... 382/275; 382/236; 382/299; 382/300; 348/402.1; 348/413.1; 348/416.1; 348/452; 348/669; 348/699
(58) Field of Classification Search .................. 382/275
See application file for complete search history.

(56) References Cited

U.S. PATENT DOCUMENTS 5,198,901 A * 3/1993 Lynch .................. 375/240.14

(Continued)

FOREIGN PATENT DOCUMENTS

| CN | 1389019 | 1/2003 |
|---|---|---|
| EP | 1 282 236 | 2/2003 |
| JP | 7 46589 | 2/1995 |
| JP | 8 322041 | 12/1996 |
| JP | 2000-324495 | 11/2000 |
| JP | 2000 324495 | 11/2000 |

OTHER PUBLICATIONS

Japanese Office Action dated Oct. 8, 2009.

(Continued)

*Primary Examiner*—Sath V Perungavoor
(74) *Attorney, Agent, or Firm*—Frommer Lawrence & Haug LLP; William S. Frommer; Ellen Marcie Emas

(57) ABSTRACT

The present invention relates to an apparatus for processing an image signal etc. that are well applicable to removal of coding noise from, for example, an image signal. Based on five consecutive frames of an image signal Va, a memory portion 121 outputs as pixel data xi of predictive taps plural items of pixel data located in a space directional and time directional peripheries with respect to a target position in an image signal Vb. In the case, frames before and after a current frame are subjected to motion compensation by using a motion vector. A class classification portion 124 obtains a class code CL indicating a class to which pixel data of the target position in the image signal Vb belongs, by using the pixel data xi and motion vectors BWV(0), BWV(−1), FWV (0), and FWV(+1). A calculating circuit 126 obtains pixel data y of the target position in the image signal Vb based on an estimation equation by using the pixel data xi and coefficient data Wi that corresponds to the class code CL.

6 Claims, 12 Drawing Sheets

U.S. PATENT DOCUMENTS

| | | | | |
|---|---|---|---|---|
| 5,303,045 | A | * | 4/1994 | Richards et al. .............. 348/443 |
| 5,400,087 | A | * | 3/1995 | Uramoto et al. .............. 348/699 |
| 5,642,166 | A | * | 6/1997 | Shin et al. ............... 375/240.15 |
| 5,717,441 | A | * | 2/1998 | Serizawa et al. ............ 345/573 |
| 5,778,097 | A | * | 7/1998 | Nickerson ................... 382/236 |
| 5,786,860 | A | * | 7/1998 | Kim et al. ............... 375/240.15 |
| 5,946,044 | A | * | 8/1999 | Kondo et al. ................ 348/458 |
| 5,991,447 | A | * | 11/1999 | Eifrig et al. ................. 382/236 |
| 6,351,494 | B1 | * | 2/2002 | Kondo et al. ........... 375/240.27 |
| 7,627,198 | B2 | * | 12/2009 | Kondo et al. ................ 382/300 |
| 2002/0036705 | A1 | * | 3/2002 | Lee et al. .................... 348/459 |
| 2002/0054045 | A1 | * | 5/2002 | Okumura et al. ............ 345/573 |
| 2002/0186888 | A1 | | 12/2002 | Kondo et al. |
| 2003/0035594 | A1 | * | 2/2003 | Kondo et al. ................ 382/298 |
| 2003/0152165 | A1 | * | 8/2003 | Kondo et al. ................ 375/316 |
| 2003/0169931 | A1 | * | 9/2003 | Lainema ..................... 382/236 |
| 2004/0120586 | A1 | * | 6/2004 | Kondo et al. ................ 382/233 |
| 2004/0190624 | A1 | * | 9/2004 | Kondo et al. ........... 375/240.16 |
| 2005/0013365 | A1 | * | 1/2005 | Mukerjee et al. ....... 375/240.16 |
| 2005/0157936 | A1 | * | 7/2005 | Sato et al. ................... 382/236 |
| 2005/0259738 | A1 | * | 11/2005 | Horishi et al. ......... 375/240.16 |
| 2006/0110051 | A1 | * | 5/2006 | Kondo et al. ................ 382/232 |
| 2009/0123083 | A1 | * | 5/2009 | Kawase et al. .............. 382/254 |

FOREIGN PATENT DOCUMENTS

| | | |
|---|---|---|
| JP | 2001-285864 | 10/2001 |
| JP | 2001-285881 | 10/2001 |
| JP | 2001-285882 | 10/2001 |
| JP | 2001-320277 | 11/2001 |
| JP | 2001-320587 | 11/2001 |
| JP | 2001-320711 | 11/2001 |
| JP | 2001 345707 | 12/2001 |
| JP | 2002-10256 | 1/2002 |
| JP | 2002-223167 | 8/2002 |
| JP | 2002-223374 | 8/2002 |
| KR | 2002-0030078 | 4/2002 |
| WO | WO 01/86820 | 11/2001 |
| WO | WO 01/97510 | 12/2001 |
| WO | WO 02/13512 A1 * | 2/2002 |

* cited by examiner

FRAME (CASE 0)

(CASE 1)

(CASE 2)

(CASE 3)

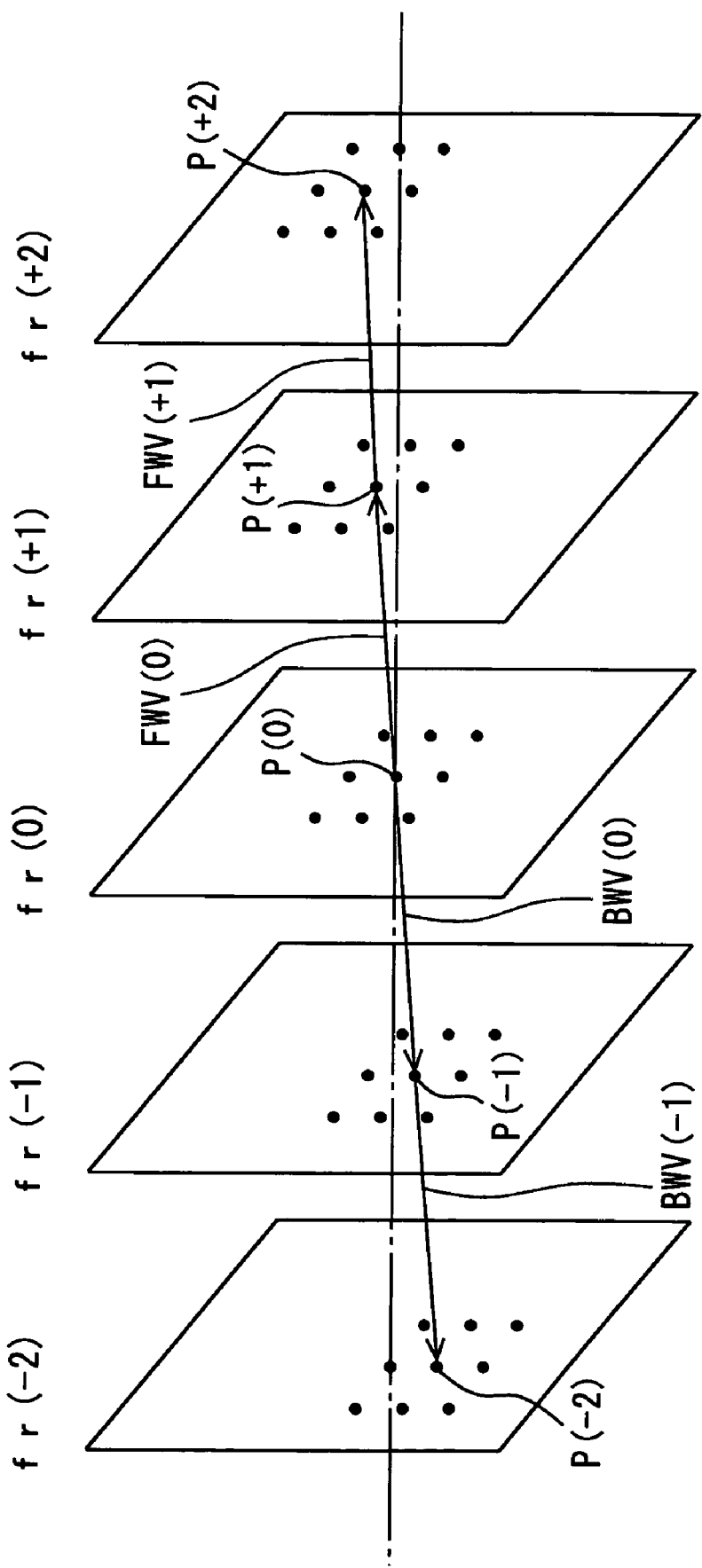

IMAGE SIGNAL, PROCESSING DEVICE AND PROCESSING METHOD, COEFFICIENT DATA GENERATION DEVICE AND GENERATION METHOD USED FOR THE SAME, PROGRAM FOR EXECUTING THE METHODS AND COMPUTER READABLE MEDIUM CONTAINING THE PROGRAM

This application is a U.S. National Phase application under 35 U.S.C. § 371 of PCT/JP03/14321 filed Nov. 11, 2003, which claims priority from Japanese Application No. 2002-337196 filed Nov. 20, 2002 which is incorporated by reference.

TECHNICAL FIELD

The present invention relates to an apparatus and a method for processing an image signal, a device and a method for generating coefficient data used by them, a program for performing these methods, and a computer-readable medium for recording the program.

More specifically, the present invention relates to an apparatus for processing an image signal etc. in which pixel data of a plurality of consecutive frames of a first image signal is stored beforehand in a plurality of frame memory portions together with a motion vector between mutually adjacent frames corresponding to this pixel data; plural items of pixel data located in a periphery in a space direction with respect to a target position in a second image signal are selected from a frame memory portion in which a current frame is stored and plural items of pixel data located in a periphery in the space direction with respect to a position obtained by performing motion compensation on the target position by using the motion vectors stored in the plurality of frame memory portions together with the pixel data are selected from a frame memory portion in which frames before and after the current frame are stored; and pixel data of the target position in the second image signal is generated using these selected plural items of pixel data, thereby enabling a quality of the second image signal to be easily improved.

BACKGROUND ART

The compression coding schemes for image signals may include coding by means of MPEG2 (Moving Picture Experts Group 2) using DCT (Discrete Cosine Transform). This coding scheme performs motion compensation predictive coding for each block.

The DCT performs discrete cosine transform on pixels in a block, re-quantizes coefficient data obtained by this discrete cosine transform, and performs variable-length coding on this re-quantized coefficient data. As this variable-length coding, entropy coding by use of codes such as Huffman codes is employed often. The image signal undergoes orthogonal transformation to be divided into many items of frequency data from a low frequency to a high frequency.

When re-quantizing these items of divided frequency data, such a quantization finely on low frequency data having a high level of importance and coarsely on high frequency data having a low level of importance is performed, taking into account human visual properties, thereby enabling effective compression to be realized while keeping a high picture quality.

According to conventional decoding by use of DCT, quantized data for each frequency component is converted into a representative value of this code and inverse DCT (IDCT: Inverse DCT) is performed on these components, thereby obtaining reproduced data. For conversion into this representative value, a quantization step width at the time of coding is used.

As described above, coding by means of MPEG using DCT has a feature that coding is performed taking into account human visual properties, to realize high efficiency compression while keeping a high picture quality.

However, coding accompanying DCT is block-unit processing, so that as a compression ratio increases, block-shaped noise, so-called block noise (block distortion) may occur in some cases. Further, a portion such as an edge subject to a steep change in luminance may be subject to blotchy noise, that is, mosquito noise due to coarse quantization of a high-frequency component.

It is conceivable that the coding noise such as block noise and mosquito noise can be removed by adaptation processing for class classification. That is, by defining an image signal containing coding noise as a first image signal and a coding noise-free image signal as a second image signal, a class to which pixel data of a target position in the second image signal belongs is detected so that in accordance with this class, the pixel data of the target position in the second image signal may be generated.

In this case, based on the first image signal, plural items of pixel data not only located in a space directional periphery with respect to the target position in the second image signal but also located in a time directional periphery thereof are selected and using these plural items of pixel data, the pixel data of the target position in the second image signal is generated, thereby enabling a quality of the second image signal to be enhanced. In this case, however, as the plural items of pixel data located in the time directional periphery, such data as to have high correlation with the plural items of pixel data located in the space directional periphery with respect to the target position needs to be selected and used.

DISCLOSURE OF THE INVENTION

It is an object of the present invention to provide an apparatus for processing an image signal etc. that allow improvements in quality of a second image signal to be easily realized.

An image signal process device related to the present invention is an apparatus for processing an image signal which converts a first image signal constituted of plural items of pixel data into a second image signal constituted of plural items of pixel data, said apparatus comprising a plurality of frame memory portions for storing pixel data of a plurality of consecutive frames of the first image signal together with a motion vector that corresponds to the pixel data and lies between mutually adjacent frames, data selection means for selecting plural items of pixel data located respectively in a time directional periphery and a space directional periphery with respect to a target position in the second image signal based on the plurality of frames stored in the plurality of frame memory portions, and pixel data generation means for generating pixel data of the target position in the second image signal by using the plural items of pixel data selected by the data selection means, wherein the data selection means selects plural items of pixel data located in the space directional periphery with respect to the target position from the frame memory portion in which a current frame in the first image signal is stored, the current frame corresponding to a frame in which the target position in the second image signal is present, and plural items of pixel data located in the space directional periphery with respect to a position obtained by performing motion compensation on the target position by using the motion vector stored in the plurality of frame memory portions together with the pixel data, from the frame memory portions in which frames before and after the current frame are stored.

An image signal processing method related to the present invention is a method for processing an image signal which converts a first image signal constituted of plural items of pixel data into a second image signal constituted of plural items of pixel data, the method comprising a first step of storing pixel data of a plurality of consecutive frames of the first image signal in a plurality of frame memory portions together with a motion vector that corresponds to the pixel data and lies between mutually adjacent frames, a second step of selecting plural items of pixel data located respectively in a time directional periphery and a space directional periphery with respect to a target position in the second image signal based on the plurality of frames stored in the plurality of frame memory portions, and a third step of generating pixel data of the target position in the second image signal by using the plural items of pixel data selected by the second step, wherein in the second step, plural items of pixel data located in the space directional periphery with respect to the target position are selected from the frame memory portion in which a current frame in the first image signal is stored, the current frame corresponding to a frame in which the target position in the second image signal is present, and plural items of pixel data located in the space directional periphery with respect to a position obtained by performing motion compensation on the target position by using the motion vector stored in the plurality of frame memory portions together with the pixel data, are selected from the frame memory portions in which frames before and after the current frame are stored.

A program related to the present invention is a program that causes a computer to perform the above-described method for processing the image signal. Further, a computer-readable medium related to the present invention records this program.

In the present invention, in a plurality of frame memory portions, pixel data of a plurality of consecutive frames of the first image signal is stored together with a motion vector that corresponds to this pixel data and lies between mutually adjacent frames.

Based on the plurality of frames stored in the plurality of frame memory portions, the plural items of pixel data located respectively in the time directional periphery and the space directional periphery with respect to the target position in the second image signal are selected.

In this case, from the frame memory portion in which a current frame, which corresponds to a frame in which the target position in the second image signal is present, of the first image signal is stored, the plural items of pixel data which is located in the space directional periphery with respect to this target position are selected. Further, from the frame memory portions in which frames before and after the current frame are stored, the plural items of pixel data which is located in the space directional periphery with respect to a position obtained by performing motion compensation on the target position by using the motion vector stored in the plurality of frame memory portions together with the pixel data are selected.

By using these selected plural items of pixel data, pixel data of the target position in the second image signal is selected. For example, the pixel data of the target position is generated as follows. That is, a class is detected to which pixel data of the target position in the second image signal belongs, to generate such coefficient data for an estimation equation as to correspond to this detected class. By using the generated coefficient data and the selected plural items of pixel data, pixel data of the target position in the second image signal is calculated on the basis of the estimation equation.

By performing motion compensation on the frames before and after the current frame by using the motion vector stored in the plurality of frame memory portions together with the pixel data, plural items of pixel data selected from the frames before and after the current frame are provided with high correlation with plural items of pixel data selected from the current frame, thereby enabling improvements in quality of the second image signal to be easily realized.

It is to be noted that at least these selected plural items of pixel data may be used to detect a class to which the pixel data of the target position in the second image signal belongs. It is thus possible to well detect a space-time class that corresponds to the plural items of pixel data used when generating the pixel data of the target position in the second image signal.

Further, each of the frame memory portions may be constituted of a plurality of banks, and the frame is divided in units of major block in which a plurality of minor blocks is arranged two-dimensionally so that the minor blocks located at different positions in the major block may be stored in each of the plurality of banks. It is thus possible to concurrently read from the plurality of banks the plural items of pixel data used when generating the pixel data of the target position in the second image signal, thereby enhancing a speed for generating the pixel data.

A device for generating coefficient data related to the present invention is a device for generating coefficient data that generates coefficient data for an estimation equation used when converting a first image signal constituted of plural items of pixel data into a second image signal constituted of plural items of pixel data, the device comprising a plurality of frame memory portions for storing pixel data of a plurality of consecutive frames of a student signal that corresponds to the first image signal together with a motion vector that corresponds to the pixel data and lies between mutually adjacent frames, data selection means for selecting plural item of pixel data located respectively in a time directional periphery and a space directional periphery with respect to a target position in a teacher signal that corresponds to the second image signal based on the plurality of frames stored in the plurality of frame memory portions, and calculation means for obtaining the coefficient data by using the plural items of pixel data selected by the data selection means and pixel data of the target position in the teacher signal, wherein the data selection means selects plural items of pixel data located in the space directional periphery with respect to the target position from the frame memory portion in which a current frame of the student signal is stored, the current frame corresponding to a frame in which the target position in the teacher signal is present, and plural items of pixel data located in the space directional periphery with respect to a position obtained by performing motion compensation on the target position by using the motion vector stored in the plurality of frame memory portions together with the pixel data, from the frame memory portions in which frames before and after the current frame are stored.

Further, a method for generating coefficient data according to the present invention is a method for generating coefficient data that generates coefficient data for an estimation equation used when converting a first image signal constituted of plural items of pixel data into a second image signal constituted of plural items of pixel data, the method comprising a first step of storing pixel data of a plurality of consecutive frames of a student signal that corresponds to the first image signal in a plurality of frame memory portions together with a motion vector that corresponds to the pixel data and lies between mutually adjacent frames, a second step of selecting plural items of pixel data located respectively in a time directional periphery and a space directional periphery with respect to a target position in a teacher signal that corresponds to the second image signal based on the plurality of frames stored in the plurality of frame memory portions, and a third step of obtaining the coefficient data by using the plural items of pixel data selected by the second step and pixel data of the target position in the teacher signal, wherein in the second step, plural items of pixel data located in the space directional periphery with respect to the target position are selected from the frame memory portion in which a current frame of the student signal is stored, the current frame corresponding to a frame in which the target position in the teacher signal is present, and plural items of pixel data located in the space directional periphery with respect to a position obtained by performing motion compensation on the target position by using the motion vector stored in the plurality of frame memory portions together with the pixel data, are selected from the frame memory portions in which frames before and after the current frame are stored.

The program related to the present invention is a program that causes a computer to perform the above-described method for generating coefficient data. Further, the computer-readable medium related to the present invention records this program.

In the present invention, in a plurality of frame memory portions, pixel data of a plurality of consecutive frames of a student signal is stored together with a motion vector that corresponds to this pixel data and lies between mutually adjacent frames.

Based on the plurality of frames stored in the plurality of frame memory portions, the plural items of pixel data located respectively in the time directional periphery and the space directional periphery with respect to the target position in the teacher signal are selected. By using these selected plural items of pixel data and the pixel data of the target position in the teacher signal, coefficient data is obtained.

In this case, from a frame memory portion in which a current frame, which corresponds to a frame in which the target position in the teacher signal is present, of the student signal is stored, the plural items of pixel data located in the space directional periphery of this target position are selected. Further, from the frame memory portions in which frames before and after the current frame are stored, the plural items of pixel data located in the space directional periphery with respect to a position obtained by performing motion compensation on the target position by using the motion vector stored in the plurality of frame memory portions together with the pixel data are selected.

In such a manner, although the coefficient data for an estimation equation is generated which is used when converting the first image signal into the second image signal, when converting the first image signal into the second image signal, pixel data of the target position in the second image signal is calculated by using the estimation equation. It is thus possible to easily realize improvements in quality of the second image signal in the case of converting the first image signal into the second image signal by using the estimation equation.

BRIEF DESCRIPTION OF THE DRAWINGS

FIG. 8 is a diagram showing a positional relationship of pixel data of each frame of a predictive tap;

BEST MODE FOR CARRYING OUT THE INVENTION

Figure 1:
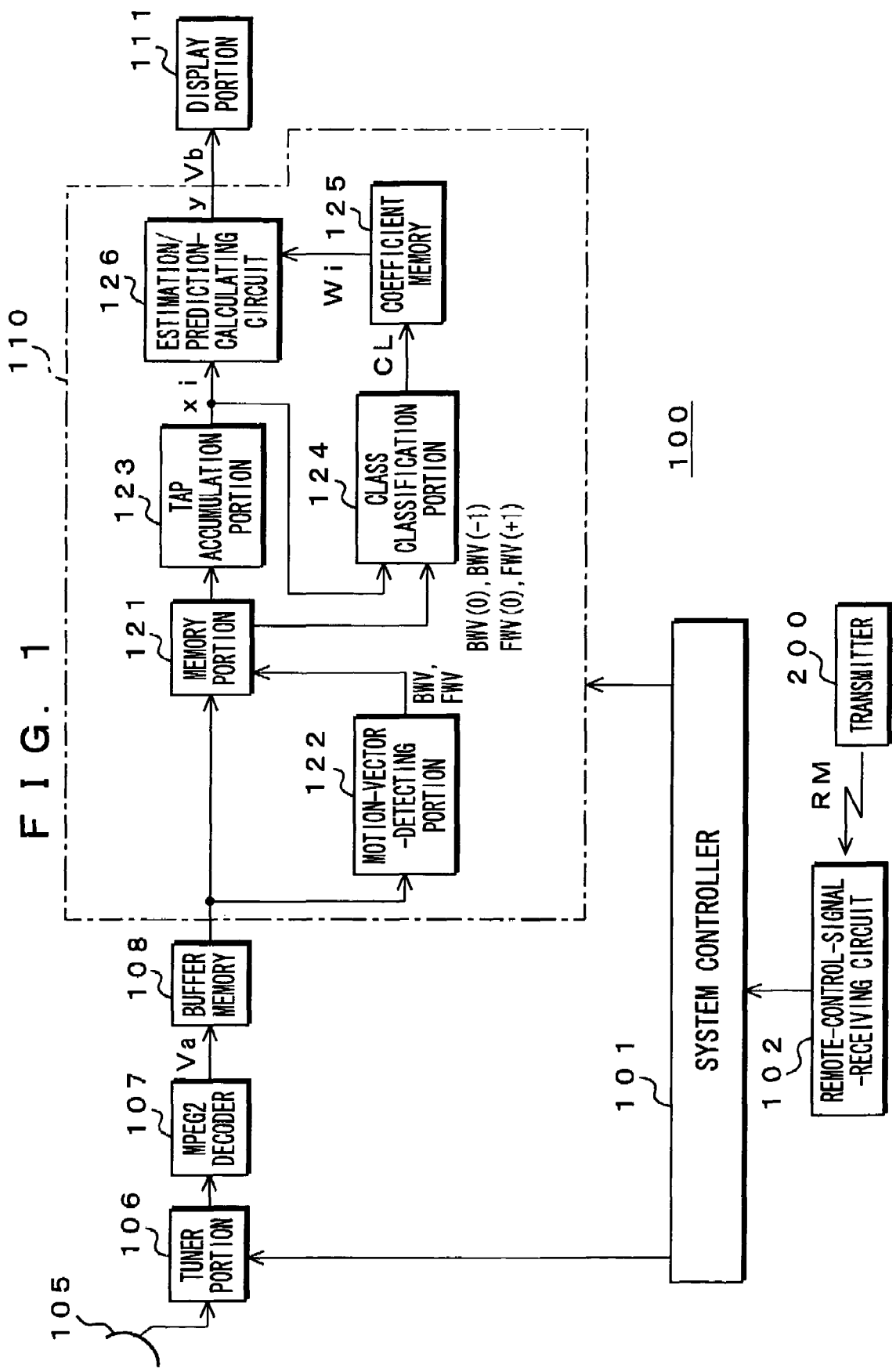
FIG. 1 is a block diagram showing a configuration of a digital broadcast receiver according to an embodiment.

The following will describe embodiments of the present invention with reference to drawings. FIG. 1 shows a configuration of a digital broadcast receiver 100 according to an embodiment.

This digital broadcast receiver 100 is equipped with a microcomputer and has a system controller 101 for controlling operations of an entire system and a remote-control-signal-receiving circuit 102 for receiving a remote-control signal RM. The remote-control-signal-receiving circuit 102 is connected to the system controller 101. This remote-control-signal-receiving circuit 102 receives a remote-control signal RM, which is output from a remote-control transmitter 200 in response to a user operation and supplies an operation signal in accordance with this signal RM to the system controller 101.

The digital broadcast receiver 100 further has a receiving antenna 105 and a tuner portion 106. The tuner portion 106 is supplied with a broadcast signal (modulated RF signal) taken by the receiving antenna 105. This tuner portion 106 performs channel selection, demodulation processing, error correcting processing, etc. on the broadcast signal, to obtain an MPEG2 stream as an encoded image signal related to a predetermined program.

The digital broadcast receiver 100 further has an MPEG2 decoder 107 for obtaining an image signal Va by decoding the MPEG2 stream output from this tuner portion 106 and a buffer memory 108 for temporarily storing the image signal Va output from this MPEG2 decoder 107.

Figure 2:
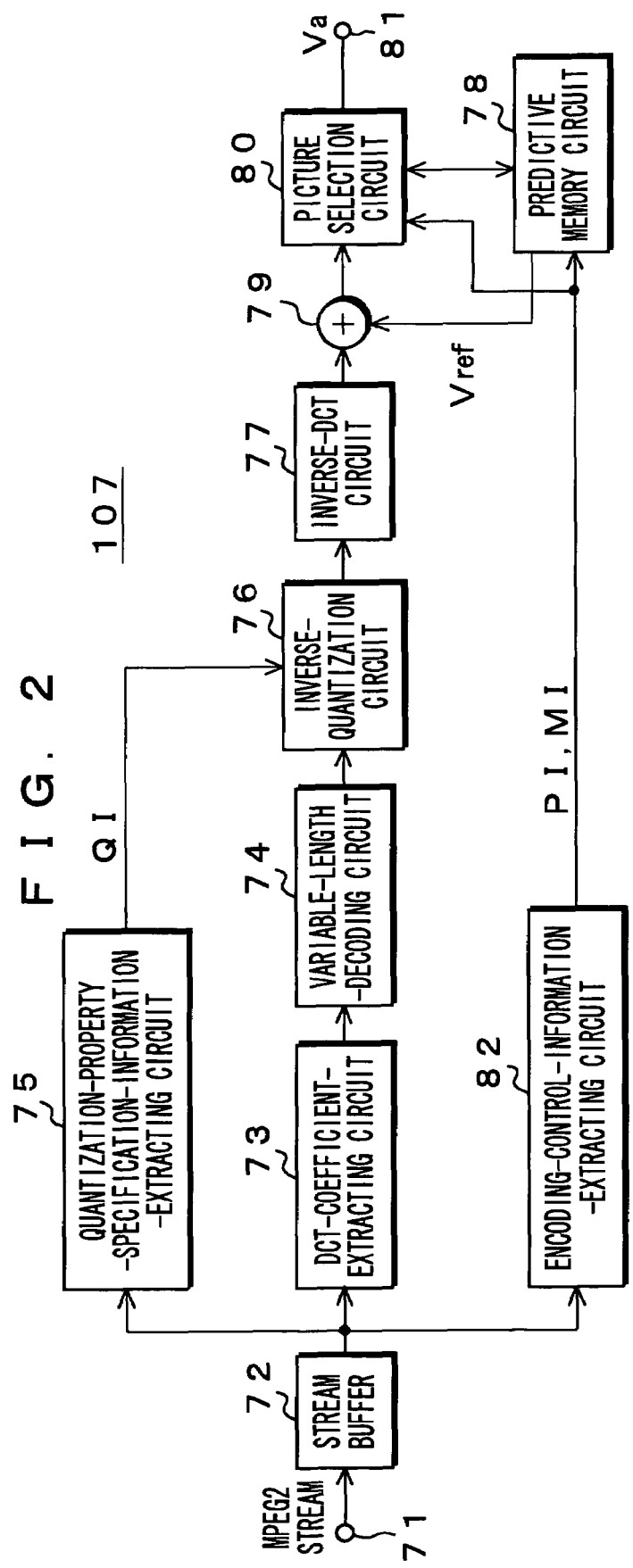
FIG. 2 is a block diagram showing a configuration of an MPEG2 decoder.

FIG. 2 shows a configuration of the MPEG2 decoder 107.

This decoder 107 has an input terminal 71 to which the MPEG2 stream is input and a stream buffer 72 for temporarily storing the MPEG2 stream input to this input terminal 71.

This decoder 107 further has a DCT-coefficient-extracting circuit 73 and a variable-length-decoding circuit 74. The extracting circuit 73 extracts a discrete cosine transform (DCT) coefficient as a frequency coefficient from the MPEG2 stream stored in the stream buffer 72. The variable-length-decoding circuit 74 performs variable-length decoding on the DCT coefficient extracted by the extracting circuit 73 and having undergone variable-length coding, for example, Huffman coding.

This decoder 107 further has a quantization-property-specification-information-extracting circuit 75, an inverse-quantization circuit 76, and an inverse-DCT circuit 77. The extracting circuit 75 extracts quantization property specification information QI from an MPEG2 stream stored in the stream buffer 72. The inverse-quantization circuit 76 inverse-quantizes a quantized DCT coefficient output from the variable-length-decoding circuit 74, based on the quantization property specification information QI. The inverse-DCT circuit 77 performs inverse DCT on the DCT coefficient output from the inverse-quantization circuit 76.

The decoder 107 further has a predictive memory circuit 78. This predictive memory circuit 78 stores pixel data of an intra-picture (I picture) and a predictive-picture (P picture) in a memory (not shown), so that if residual data of a P picture or a bi-directionally predictive-picture (B picture) is output from the inverse-DCT circuit 77, corresponding reference data Vref is generated using this pixel data and output.

The decoder 107 further has an addition circuit 79. This addition circuit 79, when residual data of a P picture or a B picture is output from the inverse-DCT circuit 77, adds reference data Vref generated by the predictive memory circuit 78 to this residual data. It is to be noted that when pixel data of an I picture is output from the inverse-DCT circuit 77, the reference data Vref is not supplied from the predictive memory circuit 78 to the addition circuit 79, so that the pixel data of the I picture output from the inverse-DCT circuit 77 is output from the addition circuit 79 as it is.

The decoder 107 further has a picture selection circuit 80 and an output terminal 81. The picture selection circuit 80 supplies the predictive memory circuit 78 with pixel data of an I picture and a P picture output from the addition circuit 79 so that this pixel data may be stored in the memory and permutes the items of pixel data of the pictures output from this addition circuit 79 in a proper order and outputs them as the image signal Va. From the output terminal 81, the image signal Va output from the picture selection circuit 80 is sent out.

It is to be noted that according to MPEG coding, signals are encoded in an order different from an actual order of frames/fields. That is, image signals of I and P pictures are encoded first and then an image signal of a B picture interposed between them is encoded. The picture selection circuit 80 changes the encoding order of the image signals of the pictures into the actual order of the frames/fields and outputs them.

The decoder 107 further has an encoding-control-information-extracting circuit 82. This extracting circuit 82 extracts coding control information, that is, picture information PI and motion-compensating vector information MI from the MPEG2 stream stored in the stream buffer 72.

The motion-compensating vector information MI extracted by the extracting circuit 82 is supplied to the predictive memory circuit 78. The predictive memory circuit 78 compensates motion by using this motion-compensating vector information MI when reference data Vref is generated. The picture information PI extracted by the extracting circuit 82 is supplied to the predictive memory circuit 78 and the picture selection circuit 80. These predictive memory circuit 78 and picture selection circuit 80 identify a picture based on this picture information PI.

Operations of the MPEG2 decoder 107 shown in FIG. 2 are described below.

An MPEG2 stream stored in the stream buffer 72 is supplied to the extracting circuit 73, which in turn extracts a DCT coefficient as a frequency coefficient. This DCT coefficient, which is variable-length coded, is supplied to the variable-length-decoding circuit 74 to be decoded. A quantized DCT coefficient of each DCT block output from this variable-length-decoding circuit 74 is supplied to the inverse-quantization circuit 76 to be inverse-quantized.

The inverse-DCT circuit 77 performs inverse DCT on the DCT coefficient of each DCT block output from the inverse-quantization circuit 76, to obtain data of each of the pictures. This data of each of the pictures is supplied via the addition circuit 79 to the picture selection circuit 80. In this case, when residual data of P or B picture is output from the inverse-DCT circuit 77, reference data Vref output from the predictive memory circuit 78 is added to it by the addition circuit 79. Pixel data of the pictures output from the addition circuit 79 are permuted by the picture selection circuit 80 into a proper order and output to the output terminal 81.

As shown in FIG. 1 again, the digital broadcast receiver 100 has an image-signal-processing portion 110 for converting the image signal Va stored in the buffer memory 108 into an image signal Vb with reduced coding noise such as block noise (block distortion) or mosquito noise and a display portion 111 for displaying an image due to the image signal Vb output from this image-signal-processing portion 110. The display portion 111 is constituted of, for example, a cathode ray tube (CRT) display or a liquid crystal display (LCD).

The following will describe operations of the digital broadcast receiver 100 shown in FIG. 1.

An MPEG2 stream output from the tuner portion 106 is supplied to the MPEG2 decoder 107 to be decoded. An image signal Va output from this decoder 107 is supplied to the buffer memory 108 to be stored temporarily.

The image signal Va stored temporarily in the buffer memory 108 is supplied to the image-signal-processing portion 110 where it is converted into an image signal Vb having reduced coding noise. From pixel data that constitutes the image signal Va, this image-signal-processing 1D portion 110 generates pixel data that constitutes the image signal Vb.

The image signal Vb obtained by the image-signal-processing portion 110 is supplied to the display portion 111. On a screen of the display portion 111, an image due to that image signal Vb is displayed.

Next, the image-signal-processing portion 110 will be described in detail.

The image-signal-processing portion 110 has a memory portion 121. This memory portion 121 receives the image signal Va stored temporarily in the buffer memory 108, provides always-stored status of predetermined consecutive frames, in this case of five consecutive frames, of this image signal Va, and selects plural items of pixel data from these five frames and outputs it as a predictive tap.

Figure 3:
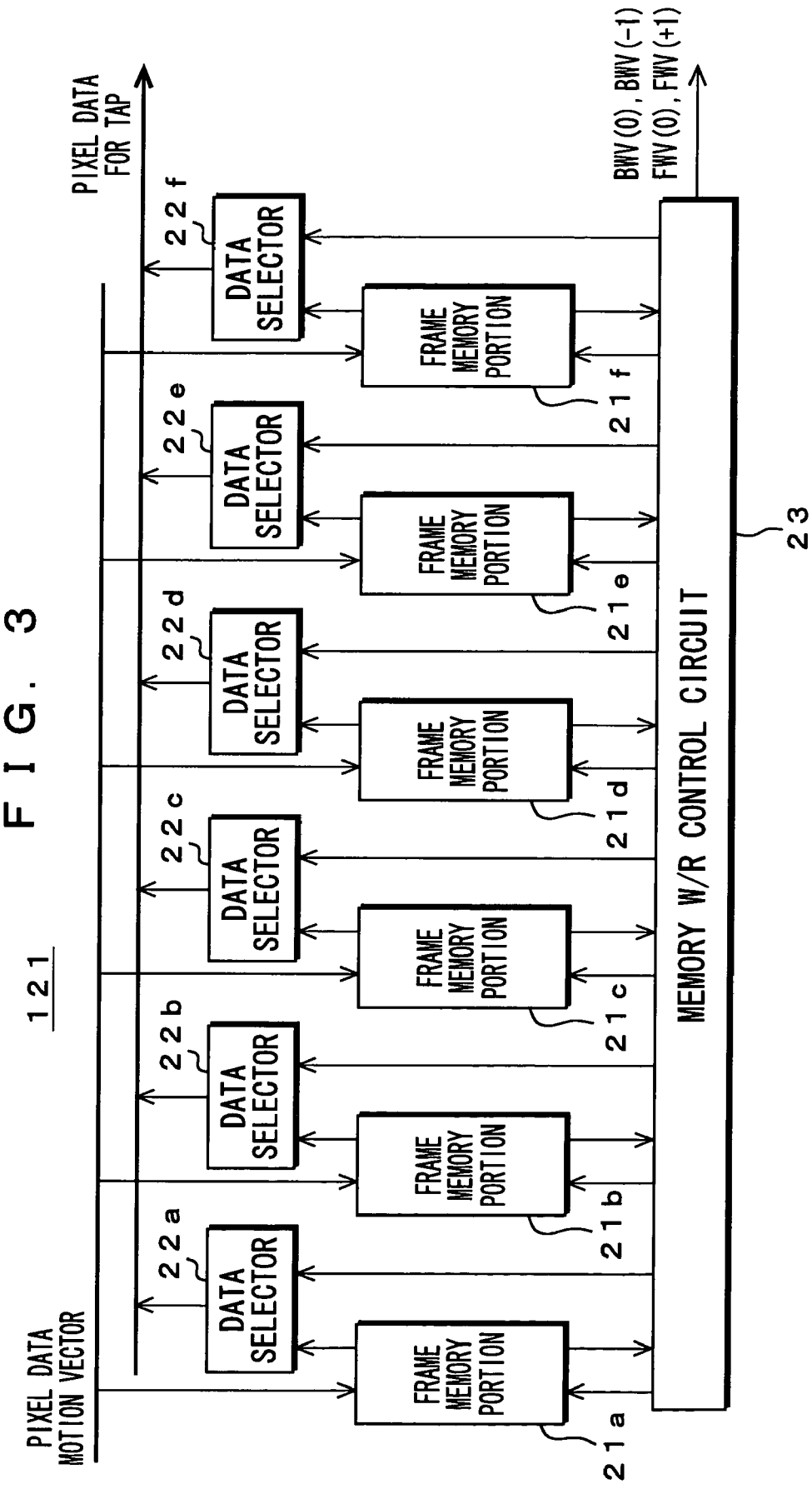
FIG. 3 is a block diagram showing a configuration of a memory portion.

FIG. 3 shows a configuration of the memory portion 121.

The memory portion 121 has six frame memory portions 21$a$-21$f$, six data selectors 22$a$-22$f$, and a memory W/R control circuit 23.

Each of the frame memory portions 21$a$-21$f$ has a capacity to store one frame of the image signal Va. In this case, each of the frame memory portions 21$a$-21$f$ stores pixel data of one frame as well as a motion vector that corresponds to each item of pixel data and lies between mutually adjacent frames.

This motion vector that lies between the mutually adjacent frames is constituted of a motion vector BWV between a current frame and an immediately backward frame and a motion vector FWV between the current frame and an immediately forward frame. These motion vectors BWV and FWV are detected by a motion-vector-detecting portion 122, which will be described later.

Figure 4:
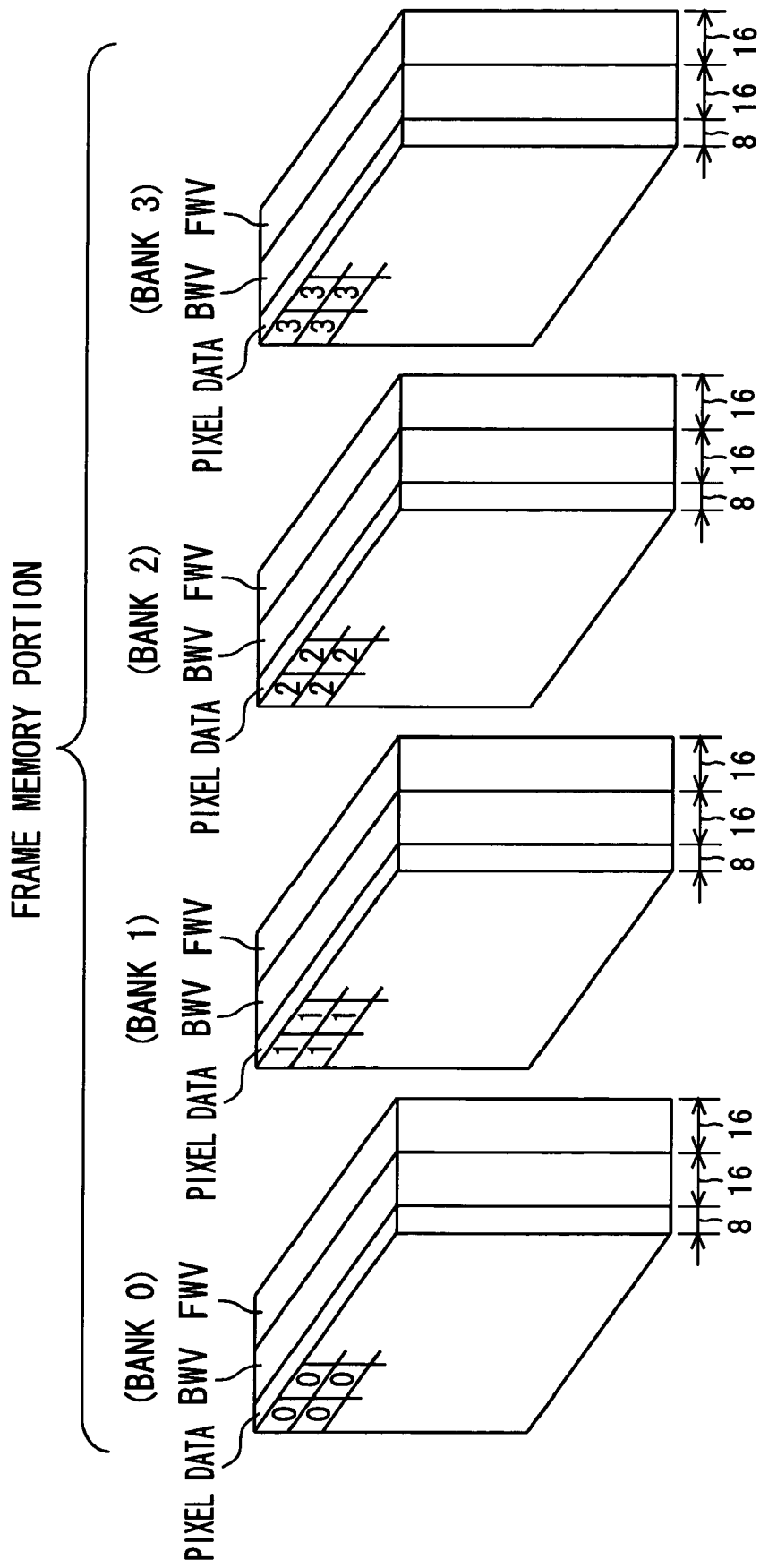
FIG. 4 is an explanatory illustration of banks that constitute a frame memory portion.
Figure 5:
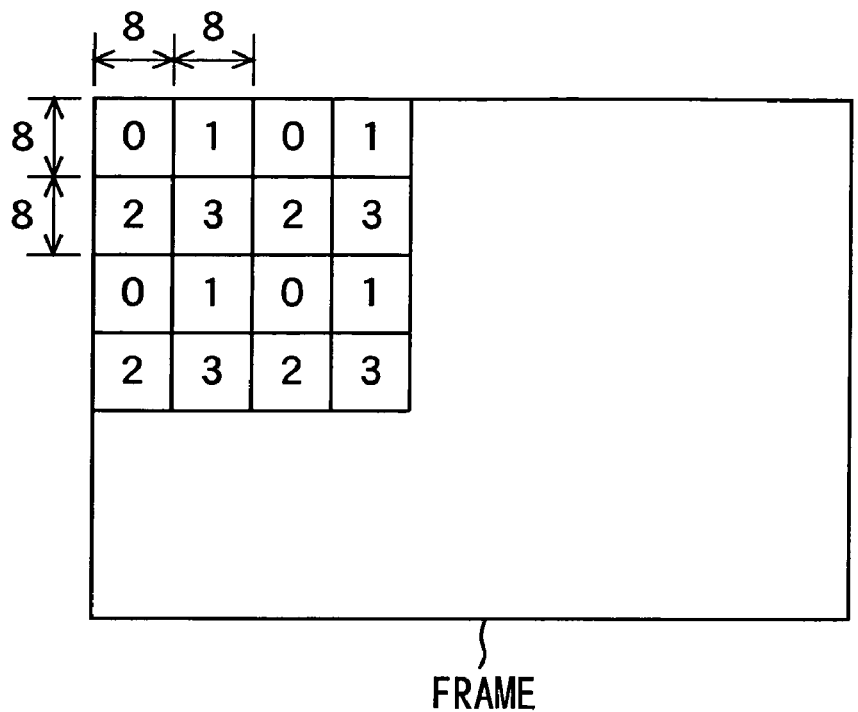
FIG. 5 is an explanatory diagram of division of a frame into blocks.

Each of the frame memory portions 21$a$-21$f$ is constituted of a plurality of banks. In the present embodiment, as shown in FIG. 4, they are each constituted of four banks of banks 0-3. In this case, a frame which is stored in each of the frame memory portions 21a-21f is divided in units of a major block in which four minor blocks "0" through "3" are arranged two-dimensionally as shown in FIG. 5.

In each of the banks 0-3, minor blocks located at different positions in a major block are stored. That is, in the bank 0, only minor blocks "0" in the major block are stored. In the bank 1, only minor blocks "1" in the major block are stored. In the bank 2, only minor blocks "2" in the major block are stored. In the bank 3, only minor blocks "3" in the major block are stored.

In the present embodiment, the minor block is constituted of 8×8 items of pixel data. It is to be noted that, for example, pixel data is eight-bit data and motion vectors BWV and FWV are each 16-bit data.

The banks 0-3 are each configured so that 8×8 items of pixel data that constitute each minor block can be read simultaneously. For example, 8×8 items of pixel data that constitute each minor block are stored in memory cells connected to the same word line, a memory structure of which is not shown.

The memory W/R control circuit 23 controls writing and reading operations to and from the frame memory portions 21a-21f and data selection by the data selectors 22a-22f.

The frame memory portions 21a-21f provide always-stored status of five consecutive frames of the image signal Va. From each of the five frame memory portions in which these five frames are stored, to take out plural items of pixel data as a predictive tap, (16×16) items of pixel data of four blocks are read.

That is, in a certain frame period, five consecutive frames (n−2), (n−1), n, (n+1), and (n+2) are stored in the frame memory portions 21a-21e and frame (n+3) is written to the frame memory portion 21f. In the next frame period, five consecutive frames (n−1), n, (n+1), (n+2), and (n+3) are stored in the frame memory portions 21b-21f and frame (n+4) is written to the frame memory portion 21a.

Further, in the next frame period, five consecutive frames n, (n+1), (n+2), (n+3), and (n+4) are stored in the frame memory portions 21c-21f and 21a and frame (n+5) is written to the frame memory portion 21b. In the following frame periods, similarly, frames (n+6), (n+7), (n+8), . . . , are written to the frame memory portions 21c, 21d, 21e, respectively.

In a certain frame period, a middle frame of the five consecutive frames of the image signal Va which are stored in the five frame memory portions is defined as a current frame fr(0) that corresponds to a frame where a target position in the image signal Vb is present.

To take out plural items of pixel data, 5×5 items of pixel data in the present embodiment, located in a periphery in a space direction (horizontal-and-vertical direction) with respect to target position P(0) from a frame memory portion in which this current frame fr(0) is stored, (16×16) items of pixel data of four blocks of a range including these plural items of pixel data are read simultaneously.

The pixel data of four blocks is constituted of pixel data of one block that is read from the above-described banks 0-3, respectively. If the 5×5 items of pixel data are present in a range of four blocks of cases 0-3 of FIG. 6A, items of pixel data of blocks indicated by black circles of cases 0-3 of FIG. 6B are read from the banks 0-3. This holds true also with the following case where items of pixel data of four blocks are read from the frame memory portions in which frames fr(−1), fr(+1), fr(−2), and fr(+2) are stored, respectively.

It is to be noted that from a frame memory portion in which this current frame fr(0) is stored, motion vectors BWV(0) and FWV(0) stored as paired with pixel data of the target position P(0) are also read. These motion vectors BWV(0) and FWV(0) are supplied to the memory W/R control circuit 23.

The memory W/R control circuit 23 performs motion compensation on the target position P(0) by using the motion vector BWV(0), to obtain position P(−1) that corresponds to this target position P(0) in frame fr(−1) that precedes the current frame fr(0). Similarly, the memory W/R control circuit 23 performs motion compensation on the target position P(0) by using the motion vector FWV(0), to obtain position P(+1) that corresponds to that target position P(0) in frame fr(+1) that follows the current frame fr(0).

To take out plural items of pixel data, 5×5 items of pixel data in the present embodiment, located in a periphery in a space direction (horizontal-and-vertical direction) with respect to position P(−1) from the frame memory portion in which frame fr(−1) is stored, (16×16) items of pixel data of four blocks including these plural items of pixel data are read simultaneously.

Similarly, to take out plural items of pixel data, 5×5 items of pixel data in the present embodiment, located in a periphery in a space direction (horizontal-and-vertical direction) with respect to position P(+1) from a frame memory portion in which frame fr(+1) is stored, (16×16) items of pixel data of four blocks of a range including these plural items of pixel data are read simultaneously.

It is to be noted that, from a frame memory portion in which frame fr(−1) is stored, a motion vector BWV(−1) stored as paired with pixel data of position P(−1) is also read. From a frame memory portion in which frame fr(+1) is stored, a motion vector FWV(+1) stored as paired with pixel data of position P(+1) is also read. These motion vectors BWV(−1) and FWV(+1) are supplied to the memory W/R control circuit 23.

The memory W/R control circuit 23 performs motion compensation on the target position P(−1) by using the motion vector BWV(−1), to obtain position P(−2) that corresponds to that target position P(0) in frame fr(−2) that precedes frame fr(−1). Similarly, the memory W/R control circuit 23 performs motion compensation on position P(+1) by using the motion vector FWV(+1), to obtain position P(+2) that corresponds to that target position P(0) in frame fr(+2) that follows frame fr(+1).

To take out plural items of pixel data, 5×5 items of pixel data in the present embodiment, located in a periphery in a space direction (horizontal-and-vertical direction) with respect to position P(−2) from a frame memory portion in which frame fr(−2) is stored, (16×16) items of pixel data of four blocks of a range including these plural items of pixel data are read simultaneously.

Similarly, to take out plural items of pixel data, 5×5 items of pixel data in the present embodiment, located in a periphery in a space direction (horizontal-and-vertical direction) with respect to position P(+2) from a frame memory portion in which frame fr(+2) is stored, (16×16) items of pixel data of four blocks of a range including these plural items of pixel data are read simultaneously.

Data selectors 22a-22f are used to selectively take out 5×5 items of pixel data which become a predictive tap, from (16×16) items of pixel data of four blocks which are read respectively from the frame memory portions 21a-21f simultaneously. In this case, the 5×5 items of pixel data taken out by each of the data selectors 22a-22f are determined uniquely by each of the positions P(−2), P(−1), P(0), P(+1), and P(+2).

Figure 6A:
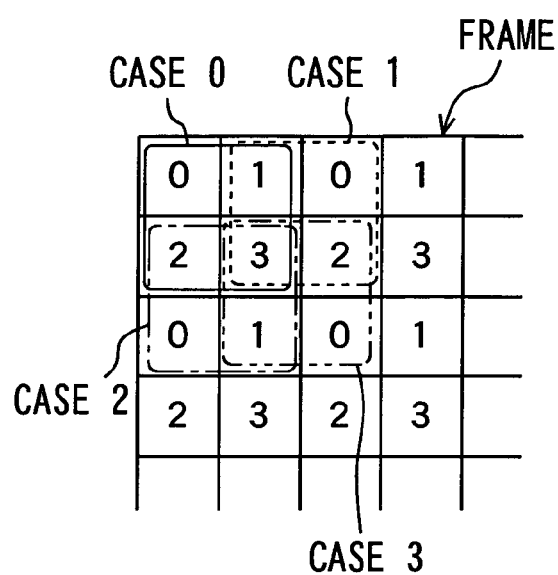
FIGS. 6A and 6B are explanatory diagrams of reading blocks from each bank.
Figure 6B:
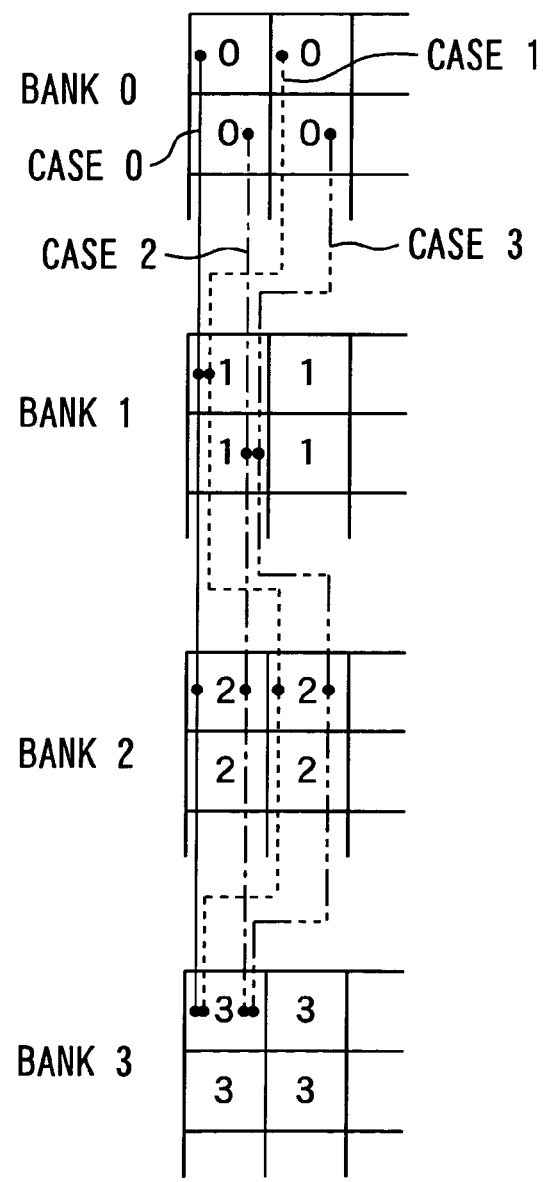
Figure 7A:
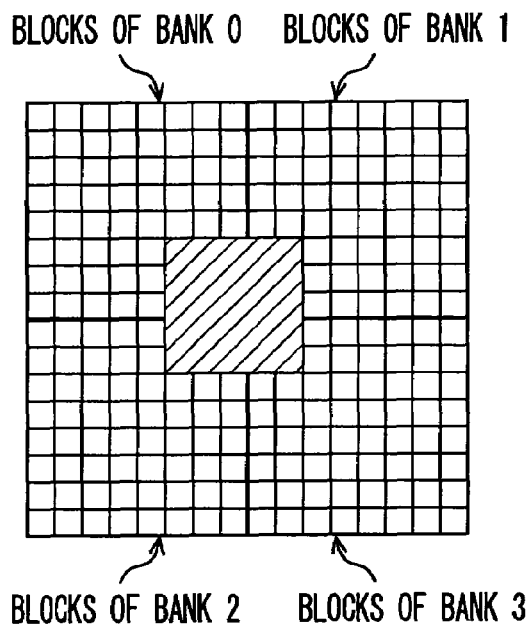
FIGS. 7A-7D show examples of taking out pixel data from read blocks in each bank.
Figure 7B:
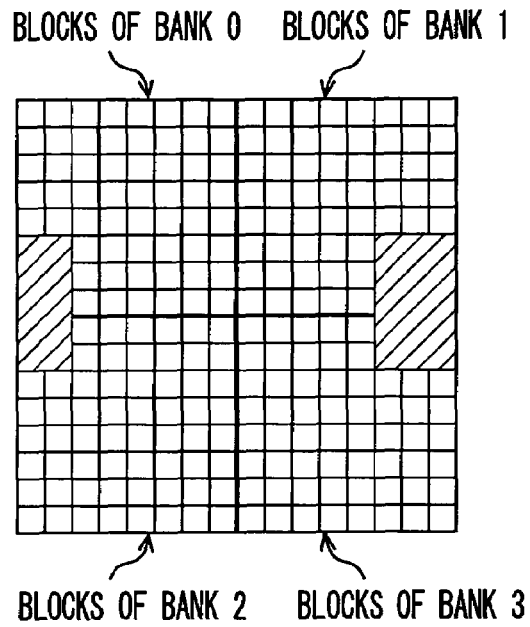

A hatched portion of FIG. 7A corresponds to case 0 shown in FIGS. 6A and 6B and indicates an example of a range of pixel data to be taken out as a predictive tap when the 5×5 items of pixel data are present over four blocks. A hatched portion of FIG. 7B corresponds to case 1 shown in FIGS. 6A and 6B and indicates an example of a range of pixel data to be taken out as a predictive tap when the 5×5 items of pixel data are present over four blocks.

Figure 7C:
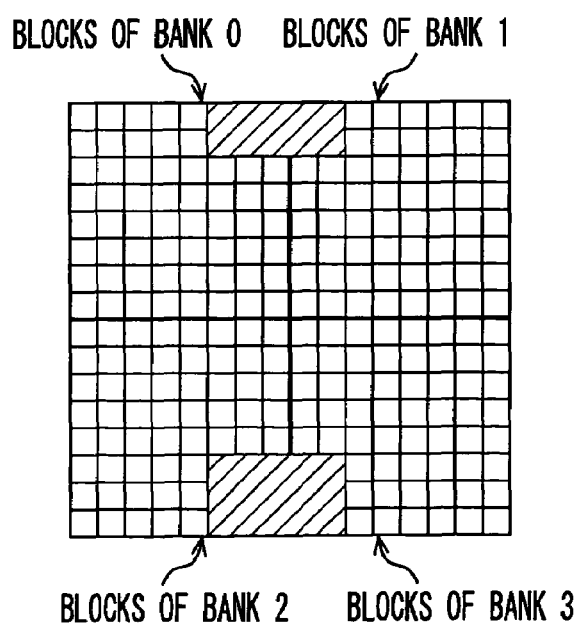
Figure 7D:
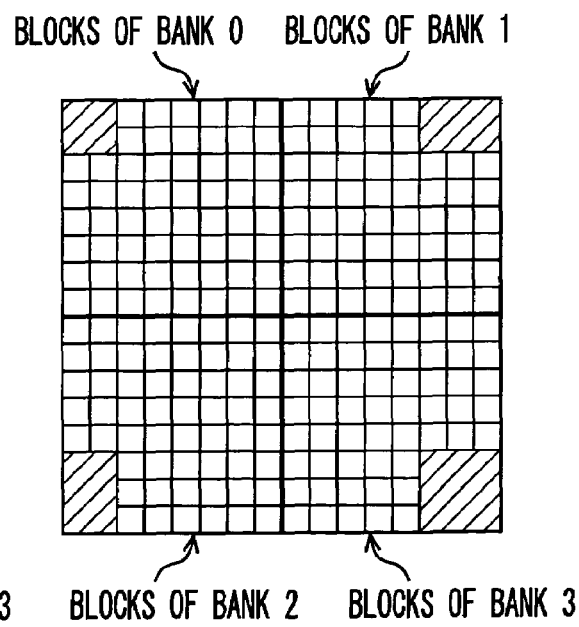

A hatched portion of FIG. 7C corresponds to case 2 shown in FIGS. 6A and 6B and indicates an example of a range of pixel data to be taken out as a predictive tap when the 5×5 items of pixel data are present over four blocks. A hatched portion of FIG. 7D corresponds to case 3 shown in FIGS. 6A and 6B and indicates an example of a range of pixel data to be taken out as a predictive tap when the 5×5 items of pixel data are present over four blocks.

In such a manner, the memory portion 121 outputs as pixel data of predictive taps the plural items of pixel data positioned in peripheries in a space direction (horizontal-and-vertical direction) and a time direction (frame direction) with respect to a target position in the image signal Vb, based on five consecutive frames fr(−2), fr(−1), fr(0), fr(+1), and fr(+2) of the image signal Va.

FIG. 8 shows a positional relationship of pixel data of each frame which is output as pixel data of predictive taps from the memory portion 121. It is to be noted that in FIG. 8, for simplification of drawings, each frame is dotted with 3×3 black points not with 5×5 black points for indicating a pixel.

As described above, position P(−1) of frame fr(−1) is obtained by performing motion compensation on the target position P(0) by using the motion vector BWV(0) and position P(−2) of frame fr(−2) is obtained by performing motion compensation on position P(−1) by using the motion vector BWV(−1). Similarly, position P(+1) of frame fr(+1) is obtained by performing motion compensation on the target position P(0) by using the motion vector FWV(0) and position P(+2) of frame fr(+2) is obtained by performing motion compensation on position P(+1) by using the motion vector FWV(+1).

Although the above description has been made with reference to the case of taking out the 5×5 items of pixel data as pixel data of predictive taps from each of the five frames fr(−2), fr(−1), fr(0), fr(+1), and fr(+2), the number of items of pixel data to be taken out from each of the frames is not limited to that. For example, it may be arranged that the largest number of items of pixel data are taken out from the current frame fr(0), followed by decreasing number of items of pixel data to be taken out from the frames with frame numbers going apart from that of the current frame fr(0).

As shown in FIG. 1 again, the image-signal-processing portion 110 further has the motion-vector-detecting portion 122. This motion-vector-detecting portion 122 detects motion vectors BWV and FWV that correspond to each of the items of pixel data that constitute the image signal Va stored in the buffer memory 108, based on this image signal Va. The motion vectors BWV and FWV are detected by this motion-vector-detecting portion 122 by using, for example, a conventionally known block-matching method.

As described above, a motion vector BWV lies between the current frame and the immediately preceding frame and a motion vector FWV lies between the current frame and the immediately following frame. The motion vectors BWV and FWV thus detected by the motion-vector-detecting portion 122 are supplied to the memory portion 121 and stored therein as paired with pixel data as described above.

The image-signal-processing portion 110 further has a tap accumulation portion 123. This tap accumulation portion 123 accumulates items of pixel data xi of predictive taps sequentially taken out from five consecutive frames fr(−2), fr(−1), fr(0), fr(+1), and fr(+2) of the image signal Va, which are output from the memory portion 121 in accordance with Z) a target position in the image signal Vb.

The image-signal-processing portion 110 further has a class classification portion 124 serving as class detection means. This class classification portion 124 generates a class code CL that indicates a class to which pixel data of a target position in the image signal Vb 5 belongs. This class classification portion 124 generates a class code CL by using items of pixel data xi (i=1−n, where n is the number of predictive taps) of predictive taps accumulated in the tap accumulation portion 123 and motion vectors BWV(0), BWV(−1), FWV(0), and FWV(+1) used to take out the pixel data xi at the memory portion 121.

Figure 9:
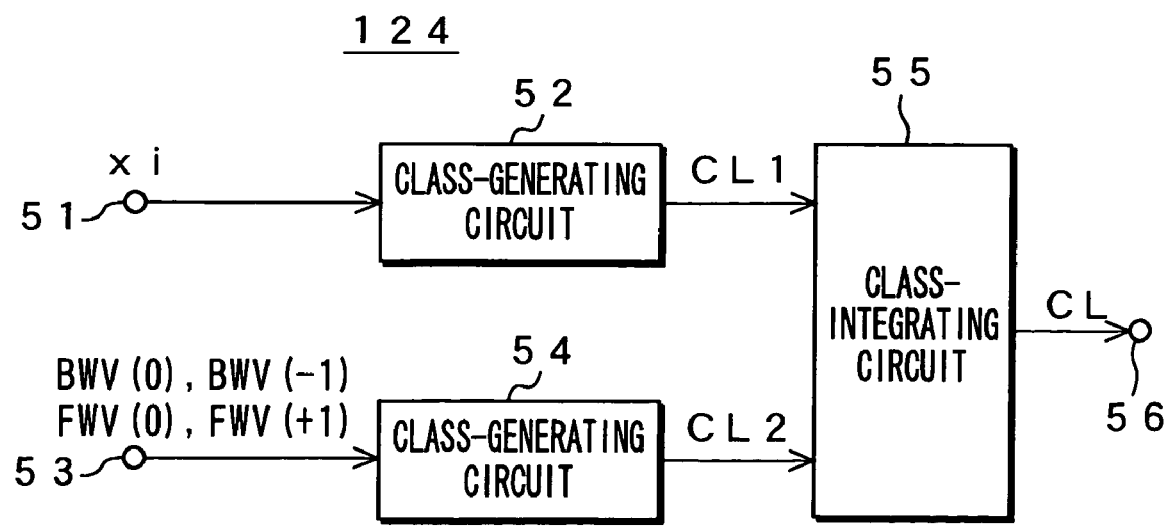
FIG. 9 is a block diagram showing a configuration of a class classification portion.

FIG. 9 shows a configuration of the class classification portion 124.

This class classification portion 124 has an input terminal 51 for receiving pixel data xi and a class-generating circuit 52. The class-generating circuit 52 generates a class code CL1 that indicates a space-time class, based on pixel data xi received through the input terminal 51. This class-generating circuit 52 performs such processing as 1-bit ADRC (adaptive dynamic range coding) on each of the items of pixel data xi, to generate a class code CL1 that indicates the space-time class.

ADRC is used to obtain a maximum value and a minimum value among plural items of pixel data of a class tap, obtain a dynamic range that is a difference between the maximum and minimum values, and re-quantize each of the pixel values in such a manner as to adapt to the dynamic range. In the case of 1-bit ADRC, a plurality of pixel values of a class tap is converted into one-bit information depending on whether it is larger or smaller than an average value of these pixel values.

The ADRC processing is performed to make the number of classes that represent a level distribution of pixel values relatively reduced. Therefore, besides ADRC, such coding may be used as VQ (vector quantization) for compressing the number of bits of the pixel value.

The class classification portion 124 further has an input terminal 53 for receiving motion vectors BWV(0), BWV(−1), FWV(0), and FWV(+1) and a class-generating circuit 54. The class-generating circuit 54 performs threshold judgment on motion vectors received through the input terminal 53, to generate a class code CL2 that indicates a class of each of the motion vectors.

The class classification portion 124 further has a class-integrating circuit 55 and an output terminal 56. The class-integrating circuit 55 integrates class codes CL1 and CL2 generated by the class-generating circuits 52 and 54 respectively to provide one class code CL. The output terminal 56 is used to output the class code CL obtained by the class-integrating circuit 55.

Operations of the class categorize circuit 124 shown in FIG. 9 will be described as follows. Items of pixel data xi accumulated in the tap accumulation portion 123 (see FIG. 1) are input to the input terminal 51 and supplied to the class-generating circuit 52. The class-generating circuit 52 performs such processing as, for example, 1-bit ADRC etc. on each of the items of pixel data xi, to generate the class code CL1 that indicates the space-time class.

Further, the motion vectors BWV(0), BWV(−1), FWV(0), and FWV(+1) are supplied from the memory portion 121 (see FIG. 1) to the input terminal 53. These motion vectors has been used in the memory portion 121 to take out the pixel data. Those motion vectors are supplied to the class-generating circuit 54. The class-generating circuit 54 performs the threshold judgment on these motion vectors, to generate a class code CL2 that indicates a class of each of the motion vectors.

The class codes CL1 and CL2 generated by the class-generating circuits 52 and 54 respectively are supplied to the class-integrating circuit 55 and integrated by it, to generate a class code CL that indicates a class to which pixel data of a target position in the image signal Vb belongs. This class code CL is output to the output terminal 56.

It is to be noted that the class classification portion 124 sets the pixel data xi as a predictive tap as it is as pixel data for generating the class code CL1. It is thus possible to share a configuration of a taken-out portion of the pixel data that is used to generate the class code CL1 with a taken-out portion of the pixel data as a predictive tap, thereby simplifying a circuit configuration. However, as this pixel data that is used to generate a class code CL1, pixel data different from the pixel data xi may be used in configuration.

As shown in FIG. 1 again, the image-signal-processing portion 110 further has a coefficient memory 125. This coefficient memory 125 stores, for each class, coefficient data Wi (i=1-n, where n is the number of predictive taps) which is used in an estimation equation utilized by an estimation/prediction-calculating circuit 126, which will be described later.

This coefficient data Wi is information for converting the image signal Va into the image signal Vb. The coefficient data Wi that is stored in this coefficient memory 125 is generated beforehand through learning between a student signal that corresponds to the image signal Va and a teacher signal that corresponds to the image signal Vb.

This coefficient memory 125 is supplied with a class code CL output from the above-described class classification portion 124, as read address information. From this coefficient memory 125, the coefficient data Wi for an estimation equation that corresponds to the class code CL is read and supplied to the later-described estimation/prediction-calculating circuit 126. A method for generating the coefficient data Wi will be described later.

The image-signal-processing portion 110 further has the estimation/prediction-calculating circuit 126. This estimation/prediction-calculating circuit 126 calculates pixel data y of a target position in an image signal Vb to be created, by using an estimation equation (1) from pixel data xi of predictive taps accumulated in the tap accumulation portion 123 and coefficient data Wi read from the coefficient memory 125.

$$y = \sum_{i=1}^{n} w_i \cdot x_i \quad (1)$$

Operations of this image-signal-processing portion 110 will be described below.

The motion-vector-detecting portion 122 detects motion vectors BWV and FWV which correspond to each of the items of pixel data that constitute the image signal Va stored in the buffer memory 108, based on this image signal Va. The motion vector BWV lies between a current frame and an immediately preceding frame and the FWV lies between the current frame and an immediately following frame.

To the memory portion 121, the image signal Va temporarily stored in the buffer memory 108 is input as well as the motion vectors BWV and FWV detected by the motion-vector-detecting portion 122 are also input thereto. In each of the frame memory portions 21a-21f that constitute the memory portion 121 (see FIG. 3), pixel data of one frame is stored as well as the motion vectors BWV and FWV that correspond to each of the items of pixel data are also stored therein.

In this case, the frame memory portions 21a-21f have five consecutive frames of the image signal Va stored in them always. From each of the five frame memory portions in which these five frames are stored, to take out 5×5 items of pixel data as a predictive tap, (16×16) items of pixel data of four blocks are read.

The pixel data of four blocks is constituted of pixel data of one block, which is read from each of the banks 0-3 (see FIG. 4) that constitute the frame memory portion. In this case, from each of the banks, 8×8 items of pixel data, which provide pixel data of one block, are read simultaneously.

The (16×16) items of pixel data of four blocks read from the frame memory portions 21a-21f are supplied to the data selectors 22a-22f (see FIG. 3) respectively. The data selectors 22a-22f selectively take out 5×5 items of pixel data to be given as a predictive tap, from (16×16) items of pixel data of four blocks respectively.

Accordingly, from the memory portion 121, based on the five consecutive frames fr(−2), fr(−1), fr(0), fr(+1), and fr(+2) of the image signal Va, plural items of pixel data located respectively in space directional and time directional peripheries with respect to a target position P(0) in the image signal Vb are output as pixel data xi of predictive taps, as shown in FIG. 8.

In this case, from frame fr(0), 5×5 items of pixel data located in the space directional periphery with respect to the target position P(0) are taken out. From frame fr(−1), 5×5 items of pixel data located in the space directional periphery of position P(−1) are taken out. From frame fr(−2), 5×5 items of pixel data located in the space directional periphery of position P(−2) are taken out. It is to be noted that the position P(−1) is obtained by performing motion compensation on the target position P(0) by using motion vector BWV(0). The position P(−2) is obtained by performing motion compensation on the position P(−1) by using motion vector BWV(−1).

Similarly, from frame fr(+1), 5×5 items of pixel data located in the space directional periphery with respect to the position P(+1) are taken out. From frame fr(+2), 5×5 items of pixel data located in the space directional periphery with respect to the position P(+2) are taken out. It is to be noted that the position P(+1) is obtained by performing motion compensation on the target position P(0) by using motion vector FWV(0). The position P(+2) is obtained by performing motion compensation on the position P(+1) by using motion vector FWV(+1).

The items of pixel data xi of predictive taps sequentially taken out from the five consecutive frames fr(−2), fr(−1), fr(0), fr(+1), and fr(+2) of the image signal Va that are output from the memory portion 121 in accordance with the target position in the image signal Vb are supplied to the tap accumulation portion 123 and accumulated in it.

The class classification portion 124 generates the class code CL 1D by using the items of pixel data xi of the predictive taps accumulated in the tap accumulation portion 123 and the motion vectors BWV(0), BWV(−1), FWV(0), and FWV(+1) used in the memory portion 121 to take out the pixel data xi. This class code CL indicates a class to which pixel data of the target position in the image signal Vb belongs.

The class code CL thus generated by the class classification portion 124 is supplied as read address information to the coefficient memory 125. In such a manner, the coefficient data Wi that corresponds to the class code CL is read from the coefficient memory 125 and supplied to the estimation/prediction-calculating circuit 126.

The estimation/prediction-calculating circuit 126 uses the pixel data xi of the predictive taps accumulated in the tap accumulation portion 123 and the coefficient data Wi read from the coefficient memory 125, to obtain pixel data y of the target position in the image signal Vb to be created, based on the estimation equation shown in the above Equation (1).

In such a manner, the image signal Vb is obtained at the image-signal-processing portion 110 from the image signal Va by using the coefficient data Wi. In this case, the pixel data y of the target position in the image signal Vb is generated on the basis of the estimation equation by using plural items of pixel data xi (pixel data of predictive taps) located respectively in the space directional and time directional peripheries with respect to the target position P(0) in the image signal Vb selected on the basis of the image signal Va and the coefficient data Wi that corresponds to a class CL to which pixel data of the target position in this image signal Vb belongs.

Therefore, by using such the coefficient data Wi as to have been obtained through learning by use of a student signal that corresponds to the image signal Va and contains coding noise similar to that of this image signal Va and a teacher signal that does not contain coding noise corresponding to the image signal Vb, it is possible to well obtain a signal, as image signal Vb, having significantly smaller coding noise than the image signal Va.

Further, at the memory portion 121, the 5×5 items of pixel data to be a predictive tap and taken out from frames fr(−2), fr(−1), fr(+1), and fr(+2) are located in a space directional periphery with respect to the positions P(−2), P(−1), P(+1), and P(+2). These positions are obtained by performing motion compensation on the target position P(0) by using the motion vectors BWV and FWV stored in the frame memory portions 21a-21f together with the pixel data. For this reason, the plural items of pixel data taken out from frames fr(−2), fr(−1), fr(+1), and fr(+2) have high correlation with the plural items of pixel data located in the space directional periphery with respect to the target position P(0).

By thus obtaining the positions P(−2), P(−1), P(+1), and P(+2) obtained by performing motion compensation using the motion vectors BWV and FWV stored in the frame memory portions 21a-21f together with the pixel data, it is possible to provide the plural items of pixel data taken out from the frames fr(−2), fr(−1), fr(+1), and fr(+2) with high correlation with the plural items of pixel data located in the space directional periphery with respect to the target position P(0), thereby easily realizing improvements in quality of the image signal Vb.

Further, items of pixel data xi as predictive taps accumulated in the tap accumulation portion 123 are supplied to the class classification portion 124 so that based on the pixel data xi, a class code CL1 that indicates a space-time class may be generated to obtain a final class code CL to which the class code CL1 is integrated. It is thus possible to well detect a space-time class that corresponds to pixel data xi that is used to generate pixel data of a target position in the image signal Vb, thereby enhancing an accuracy of class classification.

Further, by generating a class code CL1 that indicates a space-time class based on pixel data xi as a predictive tap, it is possible to eliminate a necessity of separately providing a circuit for extracting pixel data to detect a space-time class, thereby simplifying the circuit configuration.

Further, the frame memory portions 21a-21f that constitute the memory portion 121 are each configured to have banks 0-3. In each of the banks 0-3, at the time when the frame is divided in units of a major-block in which four minor blocks "0" through "3" are arranged two-dimensionally, the minor blocks which are located at different positions in the major block are stored.

Accordingly, to take out 5×5 items of pixel data to be a predictive tap, it is possible to concurrently read each block of (16×16) items of pixel data of four blocks in a range containing these 5×5 items of pixel data, from each of the banks 0-3. Therefore, a processing speed can be enhanced at which pixel data as a predictive tap is output from the memory portion 121 and then a speed can be enhanced at which pixel data of a target position in the image signal Vb is generated.

The following will describe a method for generating coefficient data Wi to be stored in the coefficient memory 125. This coefficient data Wi is generated by learning beforehand.

First, a method for this learning will be described. In the above-described equation (1), before learning, items of coefficient data $W_1, W_2, \ldots, W_n$ are undetermined coefficients. Learning is performed on plural items of signal data for each class. If the number of items of learning data is m, the following equation (2) is set in accordance with Equation (1). In it, n indicates the number of predictive taps.

$$y_k = W_1 \times x_{k1} + W_2 \times x_{k2} + \ldots + W_n \times x_{kn} \quad (2)$$

(where k=1, 2, . . . , m)

If m>n, the items of coefficient data $W_1, W_2, \ldots, W_n$ are not uniquely determined, so that an element $e_k$ of an error vector e is defined by the following equation (3), to obtain coefficient data that minimizes $e^2$ given in Equation (4). The so-called least-squares method is used to determine the coefficient data uniquely.

$$e_k = y_k - \{W_1 \times x_{k1} + W_2 \times x_{k2} + \ldots + W_n \times x_{kn}\} \quad (3)$$

(where k=1, 2, . . . , m)

$$e^2 = \sum_{k=1}^{m} e_k^2 \quad (4)$$

To actually obtain such a coefficient data as to minimize $e^2$ in Equation (4), first, as shown in Equation (5), $e^2$ can be partially differentiated using coefficient data Wi (i=1, 2, . . . , n), to obtain the coefficient data Wi so that the partially differentiated value for each of i values may be 0.

$$\frac{\partial e^2}{\partial W_i} = \sum_{k=1}^{m} 2\left(\frac{\partial e_k}{\partial W_i}\right) e_k = \sum_{k=1}^{m} 2x_{ki} \cdot e_k \quad (5)$$

A specific procedure for obtaining the coefficient data Wi from Equation (5) will be described. By defining Xji and Yi as given in Equations (6) and (7), Equation (5) can be written in a form of a determinant of Equation (8).

$$X_{ji} = \sum_{p=1}^{m} x_{pi} \cdot x_{pj} \quad (6)$$

$$Y_i = \sum_{k=1}^{m} x_{ki} \cdot y_k \quad (7)$$

-continued $$\begin{bmatrix} X_{11} & X_{12} & \ldots & X_{1n} \\ X_{21} & X_{22} & \ldots & X_{2n} \\ \ldots & \ldots & \ldots & \ldots \\ X_{n1} & X_{n2} & \ldots & X_{nn} \end{bmatrix} \begin{bmatrix} W_1 \\ W_2 \\ \ldots \\ W_n \end{bmatrix} = \begin{bmatrix} Y_1 \\ Y_2 \\ \ldots \\ Y_n \end{bmatrix} \quad (8)$$

Equation (8) is generally referred to as a normal equation. By solving this normal equation by using a general solution such as the sweeping-out method (Gauss-Jordan elimination), the coefficient data Wi (i=1, 2, . . . , n) can be obtained.

Figure 10:
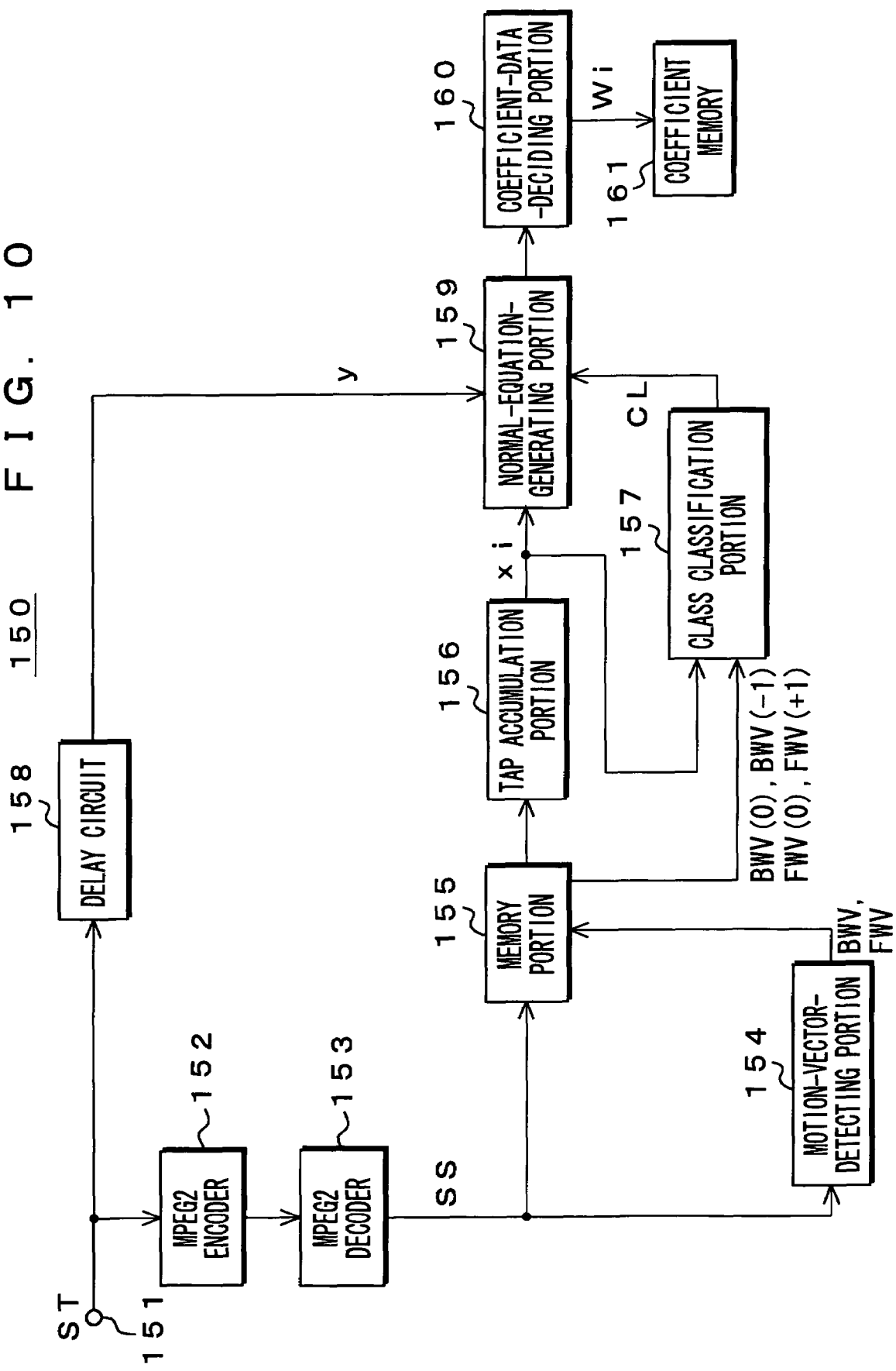
FIG. 10 is a block diagram showing a configuration of a device for generating coefficient data.

FIG. 10 shows a configuration of a device 150 for generating coefficient data Wi to be stored in the coefficient memory 125 of the image-signal-processing portion 110 shown in FIG. 1.

This device 150 for generating coefficient data has an input terminal 151 through which a teacher signal ST that corresponds to the image signal Vb is input, an MPEG2 encoder 152, and an MPEG2 decoder 153. The MPEG2 encoder 152 encodes the teacher signal ST input through the input terminal 151, to obtain an MPEG2 stream. The MPEG2 decoder 153 decodes this MPEG2 stream, to obtain a student signal SS that corresponds to the image signal Va.

It is to be noted that the MPEG2 decoder 153 corresponds to the MPEG2 decoder 107 and the buffer memory 108 in the digital broadcast receiver 100 shown in FIG. 1.

Further, the device 150 for generating coefficient data has a motion-vector-detecting portion 154. This motion-vector-detecting portion 154 is configured much the same way as the motion-vector-detecting portion 122 in the above-described image-signal-processing portion 110, to detect motion vectors BWV and FWV that correspond to each of the items of pixel data that constitute the student signal SS output from the MPEG2 decoder 153, based on this student signal SS. The motion vector BWV lies between a current frame and an immediately preceding frame and the FWV lies between the current frame and an immediately following frame.

The device 150 for generating coefficient further has a memory portion 155. This memory portion 155 is configured much the same way as the memory portion 121 in the above-described image-signal-processing portion 110. This memory portion 155 always stores five consecutive frames of the student signal SS as well as motion vectors BWV and FWV detected by the motion-vector-detecting portion 154 with them being pared with each of the items of pixel data.

Further, this memory portion 155 outputs plural items of pixel data located respectively in space directional and time directional peripheries with respect to a target position in the teacher signal ST as pixel data of predictive taps, based on five consecutive frames fr (−2), fr(−1), fr(0), fr(+1), and fr(+2) of the student signal SS.

The device 150 for generating coefficient data further has a tap accumulation portion 156. This tap accumulation portion 156 accumulates items of pixel data of predictive taps sequentially taken out from the five consecutive frames of the student signal SS which are output corresponding to the target position in the teacher signal ST. This tap accumulation portion 156 is configured much the same way as the tap accumulation portion 123 in the above-described image-signal-processing portion 110.

The device 150 for generating coefficient data further has a class classification portion 157 serving as class detection means. This class classification portion 157 generates a class code CL that indicates a class to which pixel data of a target position in the teacher signal ST belongs. This class classification portion 157 generates a class code CL by using pixel data xi (i=1–n, where n is the number of predictive taps) of predictive taps accumulated in the tap accumulation portion 156 and motion vectors BWV(0), BWV(−1), FWV(0), and FWV(+1) used to take out the pixel data xi at the memory portion 155. This class classification portion 157 is configured much the same way as the class classification portion 124 in the above-described image-signal-processing portion 110.

The device 150 for generating coefficient data further has a delay circuit 158 for timing a teacher signal ST supplied to the input terminal 151 and a normal-equation-generating portion 159. The normal-equation-generating portion 159 generates a normal equation for obtaining coefficient data Wi (i=1–n) (see Equation (8)) for each class by using pixel data y of each target position obtained from the teacher signal ST timed by the delay circuit 158, pixel data xi of predictive taps accumulated in the tap accumulation portion 156 corresponding to each of the items of pixel data y of each of the target positions, and a class code CL generated by the class classification portion 157 corresponding to each of the items of pixel data y of each of these target positions.

In this case, one item of learning data is generated by combining one item of pixel data y and the corresponding n items of pixel data xi of predictive taps, so that a number of learning data is generated for each class between the teacher signal ST and the student signal SS. Accordingly, the normal-equation-generating portion 159 generates a normal equation for obtaining coefficient data Wi (i=1–n), for each class.

The device 150 for generating coefficient data further has a coefficient-data-deciding portion 160 and a coefficient memory 161. The coefficient-data-deciding portion 160 solves the normal equation generated by the normal-equation-generating portion 159 based on data of this normal equation, to obtain the coefficient data Wi for each class. The coefficient memory 161 stores this obtained coefficient data Wi for each class.

The following will describe operations of the device 150 for generating coefficient data shown in FIG. 10.

The input terminal 151 is supplied with a teacher signal ST that corresponds to the image signal Vb, which teacher signal ST is encoded by the MPEG2 encoder 152 to generate an MPEG2 stream. This MPEG2 stream is supplied to the MPEG2 decoder 153. The MPEG2 decoder 153 decodes this MPEG2 stream, to generate a student signal SS that corresponds to the image signal Va.

The motion-vector-detecting portion 154 detects motion vectors BWV and FWV that correspond to each of the items of pixel data that constitute a student signal SS output from the MPEG2 decoder 153, based on this student signal SS.

The memory portion 155 is supplied with the student signal SS output from the MPEG2 decoder 153 as well as the motion vectors BWV and EWV detected by the motion-vector-detecting portion 154. In this memory portion 155, five consecutive frames of the student signal SS are stored always, along with which the motion vectors BWV and FWV are also stored in it as paired with each of the items of pixel data.

From this memory portion 155, plural items of pixel data located respectively in space directional and time directional peripheries with respect to a target position in the teacher signal ST are output as pixel data of predictive taps on the basis of five consecutive frames of the student signal SS. In such a manner, the items of pixel data of predictive taps output from the memory portion 155 are supplied to the tap accumulation portion 156 and accumulated in it.

The class classification portion 157 generates a class code CL by using pixel data xi of predictive taps accumulated in the tap accumulation portion 156 and motion vectors BWV(0), BWV(−1), FWV(0), and FWV (+1) used to take out the pixel data xi at the memory portion 155. This class code CL indicates a class to which pixel data of a target position in the teacher signal ST belongs.

The normal-equation-generating portion 159, on the other hand, generates a normal equation for obtaining the coefficient data Wi (i=1−n) (see Equation (8)) for each class by using pixel data y of each target position obtained from the teacher signal ST timed by the delay circuit 158, pixel data xi of predictive taps accumulated in the tap accumulation portion 156 corresponding to each of the items of pixel data y of each of the target positions, and the class code CL generated by the class classification portion 157 corresponding to each of the items of pixel data y of each of these target positions. This normal equation is solved by the coefficient-data-deciding portion 160, to obtain the coefficient data Wi for each class, and the coefficient data Wi is stored in the coefficient memory 161.

In such a manner, in the device 150 for generating coefficient data shown in FIG. 10, it is possible to generate the coefficient data Wi for each class to be stored in the coefficient memory 125 in the image-signal-processing portion 110 of FIG. 1.

The student signal SS is obtained by encoding the teacher signal ST to generate an MPEG2 stream and decoding this MPEG2 stream. Therefore, this student signal SS contains coding noise similar to that contained in the image signal Va. For this reason, in the image-signal-processing portion 110 shown in FIG. 1, the image signal Vb obtained from the image signal Va by using this coefficient data Wi has smaller coding noise than the image signal Va.

Figure 11:
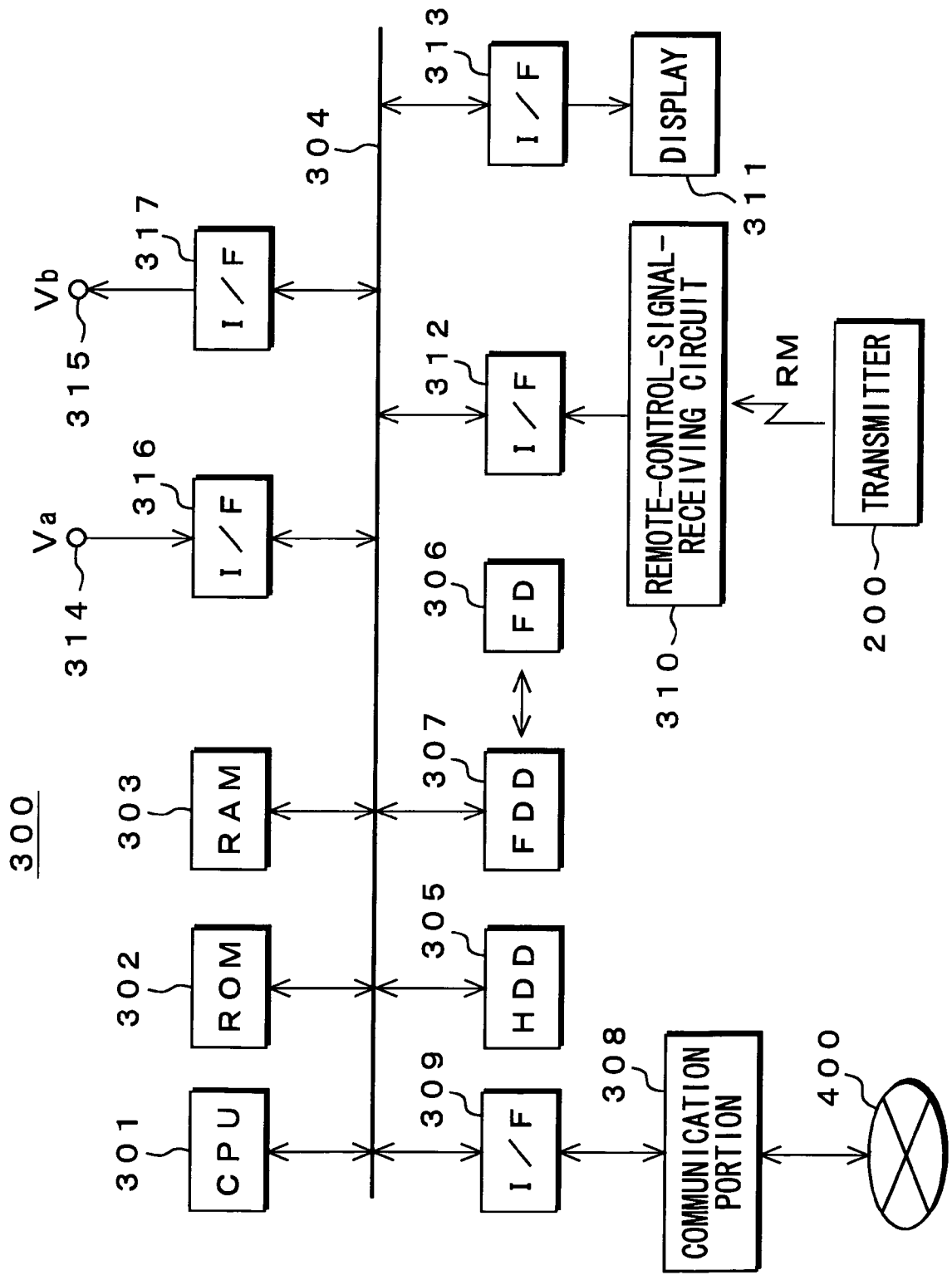
FIG. 11 is a block diagram showing a software-realized configuration of an apparatus for processing an image signal.

It is to be noted that the processing performed in the image-signal-processing portion 110 of FIG. 1 can be realized by software using an apparatus 300 for processing an image signal shown in, for example, FIG. 11.

First, the apparatus 300 for processing an image signal shown in FIG. 11 will be described. The apparatus 300 for processing an image signal has a CPU301 for controlling operations of the device as a whole, a read only memory (ROM) 302 in which a control program for this CPU301, coefficient data, etc. are stored, and a random access memory (RAM) 303 that constitutes a working space for the CPU301. These CPU301, ROM302, and RAM303 are each connected to a bus 304.

The apparatus 300 for processing an image signal further has a hard disk drive (HDD) 305 serving as an external memory device and a drive 3 (FDD) 307 for driving a floppy (registered trade name) disk 306. These drives 305 and 307 are each connected to the bus 304.

The apparatus 300 for processing an image signal further has a communication portion 308 that connects to a communication network 400 such as the Internet as wired or wirelessly. This communication portion 308 is connected to the bus 304 via an interface 309.

The apparatus 300 for processing an image signal further has a user interface portion. This user interface portion has a remote-control-signal-receiving circuit 310 for receiving a remote-control signal RM from the remote-control transmitter 200 and a display 311 constituted of a liquid crystal display (LCD) etc. The receiving circuit 310 is connected to the bus 304 via an interface 312 and the display 311 is similarly connected to the bus 304 via an interface 313.

The apparatus 300 for processing an image signal further has an input terminal 314 for receiving the image signal Va and an output terminal 315 for outputting the image signal Vb. The input terminal 314 is connected to the bus 304 via an interface 316 and similarly the output terminal 315 is connected to the bus 304 via an interface 317.

It is to be noted that instead of storing the control program, the coefficient data, etc. in the ROM 302 beforehand as described above, they may be downloaded via the communication portion 308 from the communication network 400 such as, for example, the Internet and accumulated in the HDD 305 or the RAM 303 and used. Further, these control program, coefficient data, etc. may be provided in the floppy (registered trade name) disk 306.

Further, instead of inputting the image signal Va to be processed through the input terminal 314, it may be recorded in the HDD 305 beforehand or downloaded via the communication portion 308 from the communication network 400 such as the Internet. Further, instead of or concurrently with outputting the image signal Vb after being processed to the output terminal 315, it may be supplied to the display 311 to display an image or stored in the HDD 305 or sent to the communication network such as the Internet.

Figure 12:
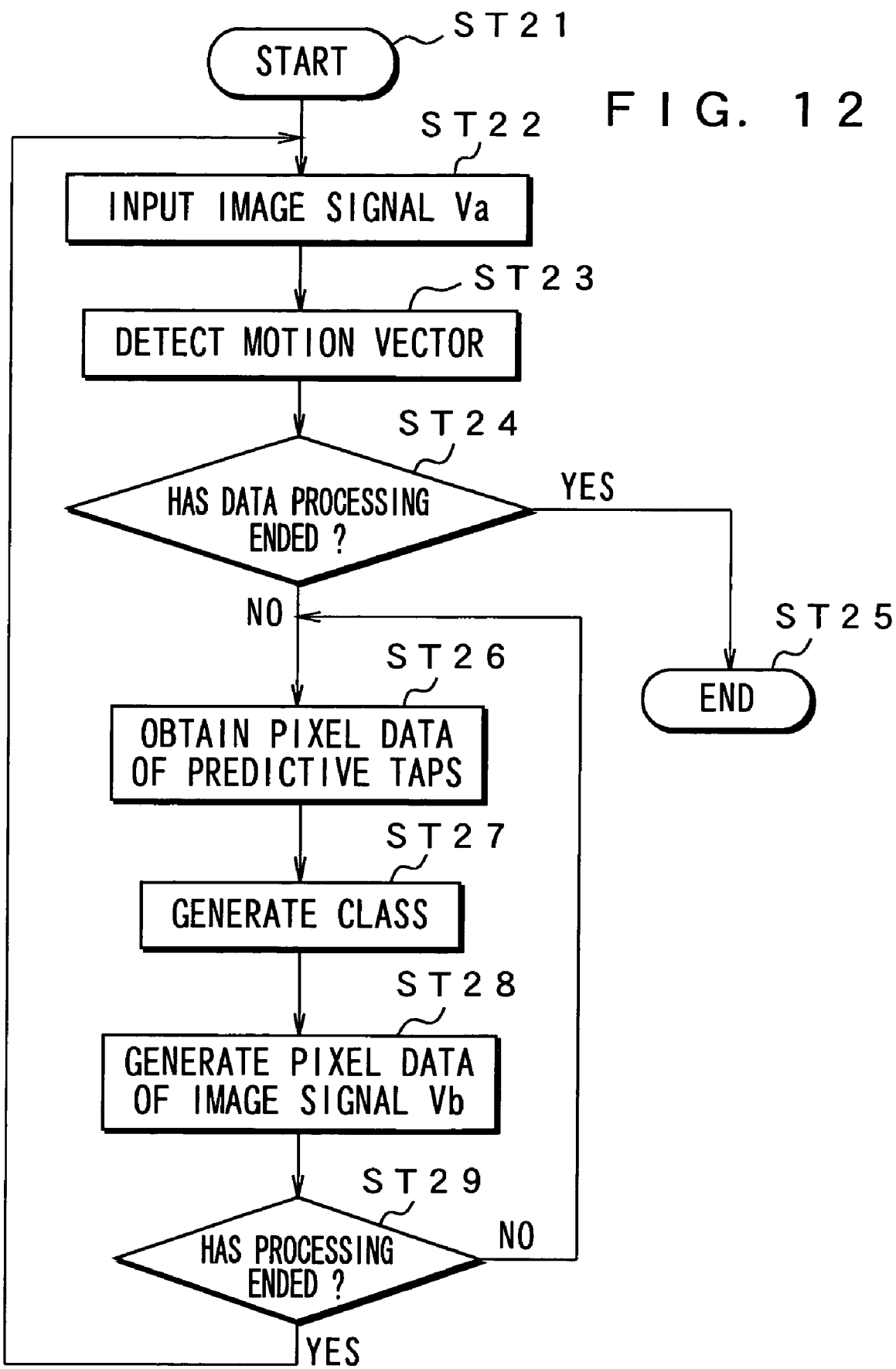
FIG. 12 is a flowchart showing image signal processing.

The following will describe a processing procedure for obtaining the image signal Vb from the image signal Va in the apparatus 300 for processing an image signal shown in FIG. 11, with reference to a flowchart of FIG. 12.

First, at step ST21, the process starts and, at step ST22, inputs the image signal Va of a plurality of frames into the apparatus from, for example, the input terminal 314. The image signal Va thus input from the input terminal 314 is stored in the RAM303 temporarily. It is to be noted that if this image signal Va is recorded in the HDD 305 in the apparatus beforehand, this image signal Va is read from this drive 305 and stored in the RAM303 temporarily.

Next, at step ST23, the process detects motion vectors BWV and FWV that correspond to each of the items of pixel data that constitute this image signal Va based on this input image signal Va.

Next, at step ST24, the process decides whether processing has been finished for all of the frames of the image signal Va. If such is the case, the process ends the processing at step ST25. Otherwise, the process goes to step ST26.

At step ST26, the process obtains as pixel data xi of predictive taps plural items of pixel data located respectively in space directional and time directional peripheries with respect to target position P(0) in the image signal Vb based on five consecutive frames fr(−2), fr(−1), fr(0), fr(+1), and fr(+2) of the image signal Va. In this case, the process performs motion compensation on frames fr (−2), fr (−1), fr (+1), and fr (+2) by using the motion vectors detected at step ST23.

Next, at step ST27, the process uses the pixel data xi of the predictive taps obtained at step ST26 and motion vectors BWV(0), BWV(−1), FWV(0), and FWV(+1) used to obtain this pixel data xi, to generate a class code CL that indicates a class to which pixel data of the target position in the image signal Vb belongs.

At step ST28, the process uses coefficient data Wi that corresponds to the class code CL generated at step ST27 and the pixel data xi of the predictive taps obtained at step ST26, to generate pixel data y of the target position in the image signal Vb based on the estimation equation of Equation (1).

Next, at step ST29, the process decides whether processing has ended that corresponds to the image signal Va of the plurality of frames input at step ST22. If such is the case, the process goes back to step ST22 where processing to input the image signal Va of the next plurality of frames is performed. Otherwise, the process goes back to step ST26 where processing of the next target position is perform.

By thus performing the processing along the flowchart shown in FIG. 12, it is possible to process pixel data of the input image signal Va, thereby obtaining pixel data of the image signal Vb. As described above, the image signal Vb thus obtained through the processing is output to the output terminal 315 or supplied to the display 311 so that an image due to it may be displayed or further supplied to the HDD 305 to be recorded in it.

Further, although not shown, processing performed in the device 150 for generating coefficient data shown in FIG. 10 can also be realized by software.

Figure 13:
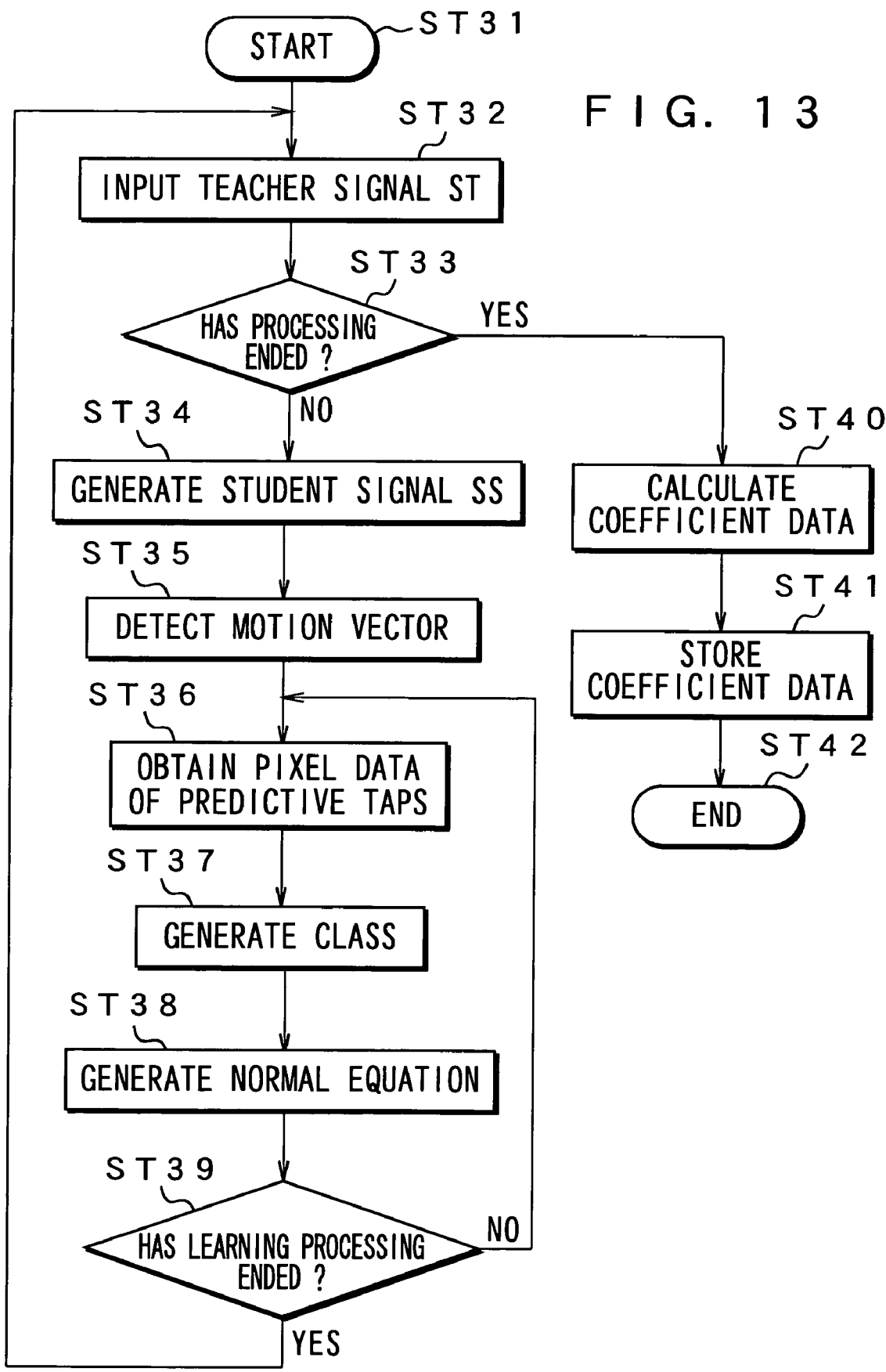
FIG. 13 is a flowchart showing coefficient data generation processing.

The following will describe a processing procedure for generating coefficient data, with reference to a flowchart of FIG. 13.

First, at step ST31, the process starts and, at step ST32, inputs the teacher signal ST of a plurality of frames. At step ST33, the process decides whether processing is finished for all of the frames of the teacher signal ST. If such is not the case, at step ST34 the process generates the student signal SS from the teacher signal ST input at step ST32.

Next, at step ST35, the process detects motion vectors BWV and FWV that correspond to each of the items of pixel data that constitute this student signal SS based on this student signal SS. At step ST36, the process obtains as pixel data xi of predictive taps plural items of pixel data located respectively in space directional and time directional peripheries with respect to target position P(0) in the teacher signal ST based on five consecutive frames fr(−2), fr(−1), fr(0), fr(+1), and fr(+2) of the student signal SS. In this case, the process performs motion compensation on frames fr(−2), fr(−1), fr(+1), and fr(+2) by using the motion vectors detected at step ST35.

Next, at step ST37, the process uses the pixel data xi of the predictive taps obtained at step ST36 and motion vectors BWV(0), BWV(−1), FWV(0), and FWV(+1) used to obtain this pixel data xi, to generate a class code CL that indicates a class to which pixel data of the target position in the teacher signal ST belongs.

At step ST38, the process uses the class code CL generated at step ST37, the pixel data xi of the predictive taps obtained at step ST36, and pixel data y of the target position in the teacher signal ST, to perform addition for obtaining a normal equation shown in Equation (8) for each class (see Equations (6) and (7)).

Next, at step ST39, the process decides whether learning processing has ended that corresponds to the teacher signal ST of the plurality of frames input at step ST32. If such is the case, the process goes back to step ST32, to input the teacher signal ST of the next plurality of frames and repeat the same processing as the above. Otherwise, the process goes back to step ST36, to perform processing of the next target position.

If it is decided at step ST33 that the processing has ended, at step ST40 the process solves the normal equation for each class generated by the addition processing performed at the above step ST38 by using the sweeping-out method etc. for each class, to calculate coefficient data Wi for each class. At step ST41, the process saves the coefficient data Wi for each class in the memory and then ends the processing at step ST42.

By thus performing the processing along the flowchart shown in FIG. 13, it is possible to obtain the coefficient data Wi for each class by using the same method as that for the device 150 for generating coefficient data shown in FIG. 10.

Although each of the frame memory portions 21a-21f that constitute the memory portion 121 is made of four banks 0-3 in the above-described embodiments, the number of banks that make up one frame memory portion is not limited to it. Further, although in the above embodiments, the minor block has been made of 8×8 items of pixel data, the size of the minor block is not limited to it.

For example, in a case where the minor block is made of 8×8 items of pixel data and pixel data to be taken out as a predictive tap from one frame exceeds in size a range of 8×8 items of pixel data, the frame memory portion can be constituted of nine banks to thereby concurrently read nine minor blocks containing the pixel data to be taken out as the predictive tap. In this case, the frame is divided into units of a major block in which nine minor blocks are arranged two-dimensionally so that the minor blocks located at different positions in this major block may be stored in each of the nine banks.

It is to be noted that in the above embodiments, the present invention has been applied to the image-signal-processing portion 110 for converting the decoded image signal Va into the image signal Vb with reduced coding noise. However, generally the present invention, of course, can be applied similarly to means for, when converting a first image signal constituted of plural items of pixel data into a second image signal constituted of plural items of pixel data, selecting plural item of pixel data located respectively in space directional and time directional peripheries with respect to a target position in the second image signal based on the first image signal, to generate pixel data of the target position in the second image signal by using this selected plural items of pixel data.

According to the present invention, pixel data of a plurality of consecutive frames of the first image signal is stored in a plurality of frame memory portions together with a motion vector that corresponds to this pixel data and lies between mutually adjacent frames, plural items of pixel data located in a space directional periphery with respect to a target position in the second image signal from a frame memory portion in which a current frame is stored is selected, and plural items of pixel data located in a space directional periphery with respect to a position obtained by performing motion compensation on the target position by using the motion vector stored in the plurality of frame memory portions together with the pixel data is selected, from frame memory portions in which frames before and after the current frame are stored, and these selected plural items of pixel data are used to generate pixel data of the target position in the second image signal. Therefore, the present invention performs motion compensation on frames before and after a current frame by using motion vectors stored in a plurality of frame memory portions together with pixel data, to provide plural items of pixel data selected from the frames before and after the current frame with high correlation with plural items of pixel data selected from the current frame, thereby enabling improvements in quality of the second image signal to be easily realized.

Further, according to the present invention, a frame memory portion has a plurality of banks so that, when each frame is divided into units of a major block in which a plurality of minor blocks is arranged two-dimensionally, the minor blocks located at different positions in this major block may be stored in each of the plurality of banks, to enable the plural items of pixel data used to generate the pixel data of the target position in the second image signal to be concurrently read from the plurality of banks, to enhance a speed for generating the pixel data.

INDUSTRIAL APPLICABILITY

As described above, an apparatus for processing an image signal etc. related to the present invention can be applied to such use as conversion of an image signal containing coding noise such as block noise or mosquito noise into an image signal from which the coding noise is removed.

The invention claimed is:

1. An apparatus for processing an image signal which converts a first image signal constituted of plural items of pixel data into a second image signal constituted of plural items of pixel data, said apparatus comprising:
   a plurality of frame memory portions for storing pixel data of a plurality of consecutive frames of the first image signal together with a motion vector that corresponds to the pixel data and lies between mutually adjacent frames;
   data selection means for selecting plural items of pixel data located respectively in a time directional periphery and a space directional periphery with respect to a target position in the second image signal based on the plurality of frames stored in the plurality of frame memory portions; and
   pixel data generation means for generating pixel data of the target position in the second image signal by using the plural items of pixel data selected by the data selection means,
   wherein each of the frame memory portions has a plurality of banks; and
      wherein when the frames are divided into units of major blocks in which a plurality of minor blocks are arranged two-dimensionally, the minor blocks located at different positions in the major blocks are stored in each of the plurality of banks,
   wherein the data selection means selects:
      plural items of pixel data located in the space directional periphery with respect to the target position from the frame memory portion in which a current frame in the first image signal is stored, said current frame corresponding to a frame in which the target position in the second image signal is present; and
      plural items of pixel data located in the space directional periphery with respect to a position obtained by performing motion compensation on the target position by using the motion vector stored in the plurality of frame memory portions together with the pixel data, from the frame memory portions in which frames before and after the current frame are stored.

2. The apparatus for processing an image signal according to claim 1, wherein the pixel data generation means comprises:
   class detection means for detecting a class to which the pixel data of the target position in the second image signal belongs;
   coefficient data generation means for generating coefficient data for an estimation equation that corresponds to the class detected by the class detection means; and
   calculation means for obtaining, by calculations, the pixel data of the target position in the second image signal based on the estimation equation by using the coefficient data generated by the coefficient data generation means and the plural items of pixel data selected by the data selection means.

3. The apparatus for processing an image signal according to claim 2, wherein the class detection means detects the class to which the pixel data of the target position in the second image signal belongs, by using at least the plural items of pixel data selected by the data selection means.

4. A method for an image signal processing apparatus for processing an image signal which converts a first image signal constituted of plural items of pixel data into a second image signal constituted of plural items of pixel data, said method comprising:
   a first step of storing pixel data of a plurality of consecutive frames of the first image signal in a plurality of frame memory portions together with a motion vector that corresponds to the pixel data and lies between mutually adjacent frames;
   a second step of selecting plural items of pixel data located respectively in a time directional periphery and a space directional periphery with respect to a target position in the second image signal based on the plurality of frames stored in the plurality of frame memory portions; and
   a third step of generating pixel data of the target position in the second image signal by using the plural items of pixel data selected by the second step,
   wherein each of the frame memory portions has a plurality of banks; and
      wherein when the frames are divided into units of major blocks in which a plurality of minor blocks are arranged two-dimensionally, the minor blocks located at different positions in the major blocks are stored in each of the plurality of banks,
   wherein in the second step,
   plural items of pixel data located in the space directional periphery with respect to the target position are selected from the frame memory portion in which a current frame in the first image signal is stored, said current frame corresponding to a frame in which the target position in the second image signal is present; and
   plural items of pixel data located in the space directional periphery with respect to a position obtained by performing motion compensation on the target position by using the motion vector stored in the plurality of frame memory portions together with the pixel data, are selected from the frame memory portions in which frames before and after the current frame are stored.

5. A computer-readable medium recording a program that causes a computer to perform a method for processing an image signal, in order to convert a first image signal constituted of plural items of pixel data into a second image signal constituted of plural items of pixel data, said method comprising:
   a first step of storing pixel data of a plurality of consecutive frames of the first image signal in a plurality of frame memory portions together with a motion vector that corresponds to the pixel data and lies between mutually adjacent frames;
   a second step of selecting plural items of pixel data located respectively in a time directional periphery and a space directional periphery with respect to a target position in the second image signal based on the plurality of frames stored in the plurality of frame memory portions; and
   a third step of generating pixel data of the target position in the second image signal by using the plural items of pixel data selected by the second step,
   wherein each of the frame memory portions has a plurality of banks; and
      wherein when the frames are divided into units of major blocks in which a plurality of minor blocks are arranged two-dimensionally, the minor blocks located at different positions in the major blocks are stored in each of the plurality of banks,
   wherein in the second step,
   plural items of pixel data located in the space directional periphery with respect to the target position are selected from the frame memory portion in which a current frame in the first image signal is stored, said current frame corresponding to a frame in which the target position in the second image signal is present; and plural items of pixel data located in the space directional periphery with respect to a position obtained by performing motion compensation on the target position by using the motion vector stored in the plurality of frame memory portions together with the pixel data, are selected from the frame memory portions in which frames before and after the current frame are stored.

6. A program, stored on a computer-readable medium, that causes a computer to perform a method for processing an image signal, in order to converts a first image signal constituted of plural items of pixel data into a second image signal constituted of plural items of pixel data, said method comprising:

a first step of storing pixel data of a plurality of consecutive frames of the first image signal in a plurality of frame memory portions together with a motion vector that corresponds to the pixel data and lies between mutually adjacent frames;

a second step of selecting plural items of pixel data located respectively in a time directional periphery and a space directional periphery with respect to a target position in the second image signal based on the plurality of frames stored in the plurality of frame memory portions; and a third step of generating pixel data of the target position in the second image signal by using the plural items of pixel data selected by the second step, wherein each of the frame memory portions has a plurality of banks; and wherein when the frames are divided into units of major blocks in which a plurality of minor blocks are arranged two-dimensionally, the minor blocks located at different positions in the major blocks are stored in each of the plurality of banks, wherein in the second step, plural items of pixel data located in the space directional periphery with respect to the target position are selected from the frame memory portion in which a current frame in the first image signal is stored, said current frame corresponding to a frame in which the target position in the second image signal is present; and plural items of pixel data located in the space directional periphery with respect to a position obtained by performing motion compensation on the target position by using the motion vector stored in the plurality of frame memory portions together with the pixel data, are selected from the frame memory portions in which frames before and after the current frame are stored.

* * * * *